United States Patent [19]
Thompson

[11] Patent Number: 5,872,594
[45] Date of Patent: Feb. 16, 1999

[54] METHOD FOR OPEN LOOP CAMERA CONTROL USING A MOTION MODEL TO CONTROL CAMERA MOVEMENT

[76] Inventor: Paul A. Thompson, P.O. Box 411, Princeton, Ala. 35766

[21] Appl. No.: 519,138

[22] Filed: Aug. 24, 1995

Related U.S. Application Data

[63] Continuation-in-part of Ser. No. 309,268, Sep. 20, 1994, abandoned.

[51] Int. Cl.⁶ .............................. H04N 5/232; H04N 7/18
[52] U.S. Cl. ......................... 348/213; 348/143; 348/159
[58] Field of Search .............................. 348/39, 36, 143, 348/152, 153, 159, 218, 211, 213, 187, 138; 396/94; 340/825.49; 364/150, 149, 474.24, 560, 561

[56] References Cited

U.S. PATENT DOCUMENTS

| | | | |
|---|---|---|---|
| 4,992,866 | 2/1991 | Morgan | 348/159 |
| 5,182,641 | 1/1993 | Diner et al. | 348/159 |
| 5,251,156 | 10/1993 | Heier et al. | 364/560 |
| 5,262,867 | 11/1993 | Kojima | 348/389 |
| 5,526,041 | 6/1996 | Glatt | 348/213 |

FOREIGN PATENT DOCUMENTS

| | | | |
|---|---|---|---|
| 06038087 | 2/1994 | Japan | H04N 5/232 |

*Primary Examiner*—Wendy Garber
*Assistant Examiner*—Luong Nguyen
*Attorney, Agent, or Firm*—Mark Clodfelter

[57] ABSTRACT

A camera control system incorporating a data processor is provided which uses a coordinate system based on CADD drawings and motion models of the cameras to effect open loop camera control of various cameras of the system. Various input and pointing devices are used to communicate with the system, and camera video is processed by the data processor.

27 Claims, 17 Drawing Sheets

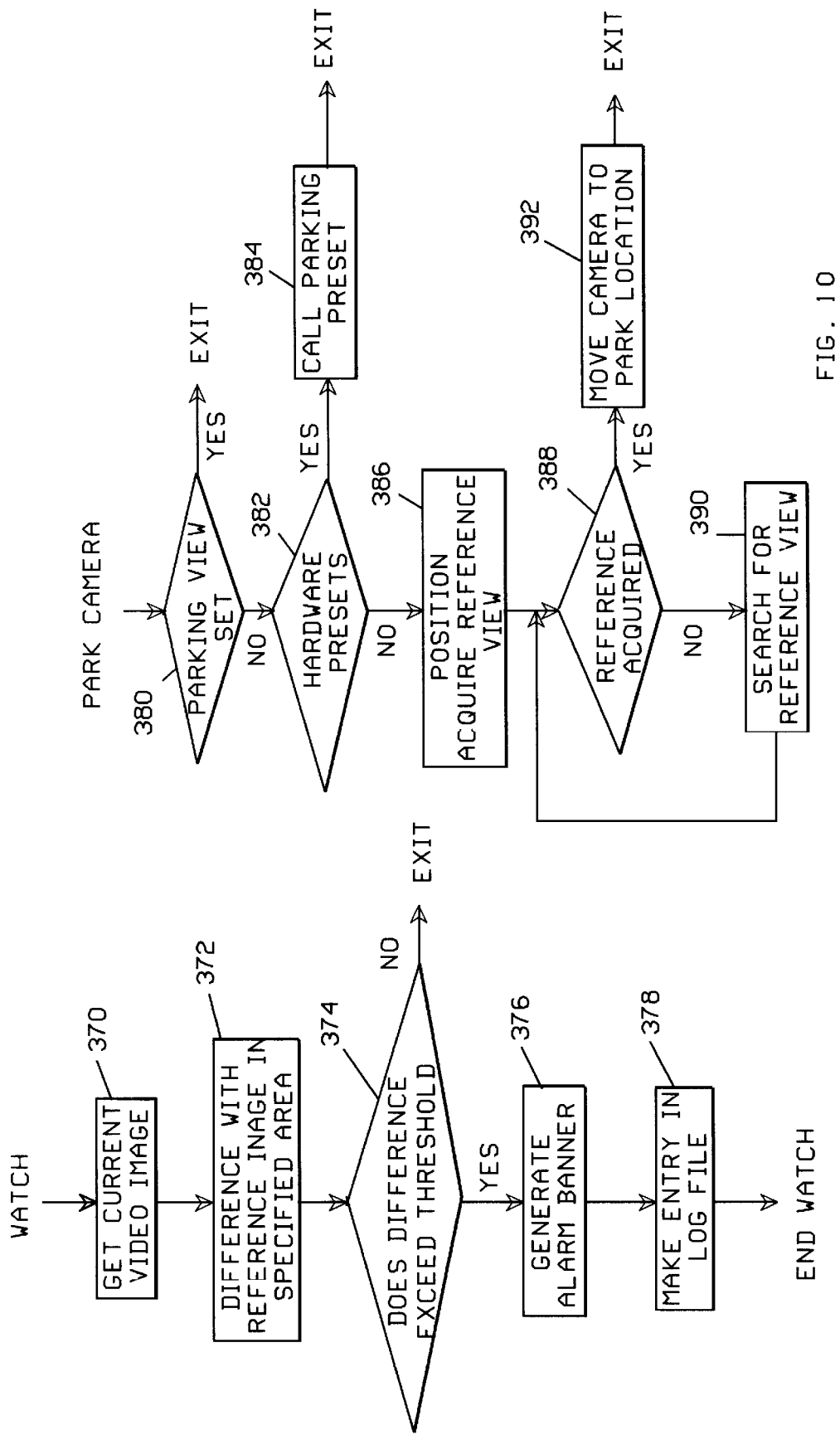

METHOD FOR OPEN LOOP CAMERA CONTROL USING A MOTION MODEL TO CONTROL CAMERA MOVEMENT

CROSS REFERENCE TO RELATED APPLICATION

This application is a continuation-in-part of patent application Ser. No. 08/309,268, filed Sep. 20, 1994 now abandoned.

FIELD OF THE INVENTION

This invention relates generally to control systems for surveillance cameras, and particularly to a computer operated open loop control system which uses three dimensional coordinates for controlling camera movements.

BACKGROUND OF THE INVENTION

With respect to complex surveillance systems, such as those found in gaming establishments, schools, and shopping malls, surveillance cameras are typically placed in transparent domes mounted in ceilings or other supports, such as on poles in a parking lot.

In these systems, camera operators typically use a joystick type control to effect pan and tilt movements of various controllable cameras of the system. Zoom, focus, and iris functions of lenses coupled to these cameras are typically controlled by a keypad having discrete keys marked with these functions. A video switching matrix selectively couples video outputs from the cameras to a plurality of monitors, with the switching matrix controlled through the use of the keypad. In addition to controllable cameras, the surveillance system may also include fixed cameras, such as those directed toward doors, elevators, money counting rooms, cashier stations and the like.

A typical surveillance application will have many more cameras than monitors, and fewer operators than monitors. As a result, many of the views being observed by cameras are not monitored or recorded. For example, there may be cameras in locations that are normally not occupied, as in a money counting room. Surveillance operators are often required to periodically examine these areas but their work loads often prevent them from being able to accomplish this task on a timely basis. While size of these systems and ratios of the number of monitors with respect to the number of cameras varies widely, in a gambling casino there may be something on the order of about 500 surveillance cameras selectively coupled to 30 monitors, with two to five operators controlling the system and observing the monitors.

In these gambling casinos and other installations, surveillance operators must be proficient with using the surveillance system and be thoroughly familiar with the layout of the areas being observed. A surveillance operator must, within a short period of time, be able to bring up on a monitor random views; such as particular slot machines or gaming tables, views of money counting rooms, etc. While operators are provided with lists or drawings of locations of cameras and the particular objects or areas of interest, there may be thousands of views from hundreds of cameras that are of concern to an operator. As such, when asked to view a randomly selected area not routinely viewed, an operator may experience difficulty in locating a listing or drawing of the area, identifying the appropriate camera, maneuvering the camera and bringing up the view on a monitor. This is an undesirable situation as a risk exists that some critical activity may not be timely located and viewed by the surveillance system.

Another concern of surveillance operators relates to the need for returning cameras to to their "parking views", which are typically critical locations, such as a view including an exit, and to which the camera should be returned after use. Here, due to the necessity of having to constantly watch a monitor and control cameras during surveillance operations, the task of returning a previously used camera to it's parking view becomes a burden, and can be done only intermittently by the operators. As a result, cameras may be left in random positions, meaning that the next time a camera in such a position is used, critical time may be lost acquiring the desired view, such as when observing a suspicious person or a view responsive to an alarm indication.

Controllable cameras in surveillance systems generally fall into three categories, 1) Inexpensive, manually operated, cameras only capable of movement responsive to manual pan, tilt, zoom, focus and iris commands from an operator, and which are the most common type, 2) More expensive, semi-automated cameras equipped with "preset" controls, which use servo mechanisms to position the camera to internally stored pan, tilt, zoom, focus, and iris positions. With this data, a plurality of "preset" views for each camera may be stored in the camera and used to direct the respective camera to a one, or a sequence, of these preset views responsive to operating a key on the keypad, and 3) very expensive cameras containing computers capable of complex operations such as communicating information to the camera control system.

For cameras with preset capability, the number of preset views is set for each camera, such as 32 for one widely used camera. When there are hundreds of cameras equipped with preset capability, there may be thousands of preset views. As a result of the difficulty in remembering names and locations of this quantity of preset views, surveillance operators often do not use the preset capability to its full advantage, preferring instead to simply pan or tilt a camera to locations which they wish to view.

At the present time, a typical installation will have an architect's CADD (computer assisted drafting and designing) drawing available that contains information, such as in floor plans, wherein objects in the drawings are represented graphically and located with great precision. Generally, objects in these drawings are constructed as a series of lines, circles, or other geometrical shapes, each of which scaled to size using X and Y Cartesian Coordinates, with these drawing files known as "vector" format files. In most drawings, such as those of gambling casinos, there are many objects in the CADD floorplan that are represented by the same graphical outline, such as slot machines, which symbols being stored by the CADD program in a manner so as to not repetitively generate the symbol in memory. This is done by creating one image of the symbol in vector format and including in the image a reference point for locating the symbol in the drawing. This single image with a reference point is commonly known as a "component", with a typical drawing including a number of differing components. As such, after the image of the component is generated, it is only necessary to store a component reference name, rotation and scaling information, and coordinates, or "vectors" at which the reference point in the component is located in order to regenerate the object as many times as necessary. Once located in a CADD drawing, These individual objects are commonly known as "entities".

The CADD drawing and symbols therein may be converted and stored in several formats, two of which having gained considerable acceptance being the DXF and PCX formats. The PCX format, developed by PC PUBLISHER, is supported by most CADD programs, and is simply a bit mapped format where intensity and color values of each pixel making up an image is stored as a map in a digital format. The DXF format, developed by AUTODESK, stores coordinates of the drawing in an ASCII vector format, which is recognized by most, if not all, CADD programs. Thus, the majority of CADD drawings or selected elements therein can be converted by their respective programs to both the PCX and DXF formats from their native, usually proprietary formats.

Prior art of which Applicant is aware includes U.S. Pat. No. 4,992,866, issued to Morgan on Feb. 12, 1991. This reference discloses a camera control system requiring a number of computer controlled cameras, i.e. cameras that generate position information at the pan, tilt, zoom and focus motor drives and provide this information as feedback signals to operate the cameras in a closed loop configuration. These closed loop feedback signals are used in conjunction with a diagram that a user references to control movements of selected cameras. A conventional touch screen monitor and video switching matrix, under control of a microprocessor, provides a user with several options for selecting a particular camera, view, and monitor from a particular graphical representation.

While this system provides a relatively simple way to use a touch screen to effect camera, view, and monitor selection, it is limited in that it requires an operator to select from a predefined list of fixed views, or "assets" located in the diagram, which are similar to presets. Further, there is no ability to select an arbitrary location to view, or to refer to entities to be viewed by name, as is found in a CADD drawing. Further yet, there is no disclosure in Morgan as to how the graphical representations relate to camera movement, or how these graphical representations are constructed. In addition, there is no capability for the system to monitor the camera video, or relate portions of the video to locations on the diagram.

Another reference, U.S. Pat. No. 5,111,288, issued to Blackshear on May 5, 1992, discloses a feedback signal operated, closed loop camera system in conjunction with computer control used to store in memory one or more predetermined "presets", or views of particular interest. Computer routines are provided for controlling camera movements from one preset to another preset. Additional computer routines are provided for immediately moving a camera to view a preset responsive to an alarm.

Again, the system of Blackshear requires "smart" cameras with feedback position information of the pan and tilt mechanisms, with the attendant high cost of the cameras. Also, as each preset and sequence of presets must be manually entered into the computer, the system lacks the versatility needed for a large surveillance operation, such as found in a gambling casino.

To date, Applicant is unaware of any attempt to develop a surveillance camera control system wherein cameras are controlled in an open loop configuration (without requiring position feedback signals) by a data processor using a coordinate system, such as found in CADD drawings, for referencing camera movement. Further, Applicants system utilizes data from conventional CADD drawings for the purpose of operating surveillance cameras and monitors more effectively than is possible with methods of the known prior art.

Accordingly, it is a broad object of this invention to provide open loop control of surveillance cameras in conjunction with a coordinate system for referencing camera movement. In addition, numerous capabilities are provided that makes the system extremely flexible, and particularly useful in a system involving a number of large areas where numerous objects are to be monitored using a large number of cameras.

SUMMARY OF THE INVENTION

A method is disclosed for controlling via a data processor a surveillance system having a plurality of surveillance cameras selectively providing video outputs to a plurality of monitors. A coordinate system is superimposed over the area surveilled by the camera, and is accessible by the data processor to reference camera movement. When a point in the surveilled area is selected for viewing, camera movement to the selected point is calculated, the camera moved to view the selected location, and a view of the selected location provided to the monitor.

BRIEF DESCRIPTION OF THE DRAWINGS

FIG. 9 is a flowchart depicting a watch function of the present invention.

FIG. 10 is a method of parking cameras of the present invention

DETAILED DESCRIPTION OF THE DRAWINGS

Figure 4:
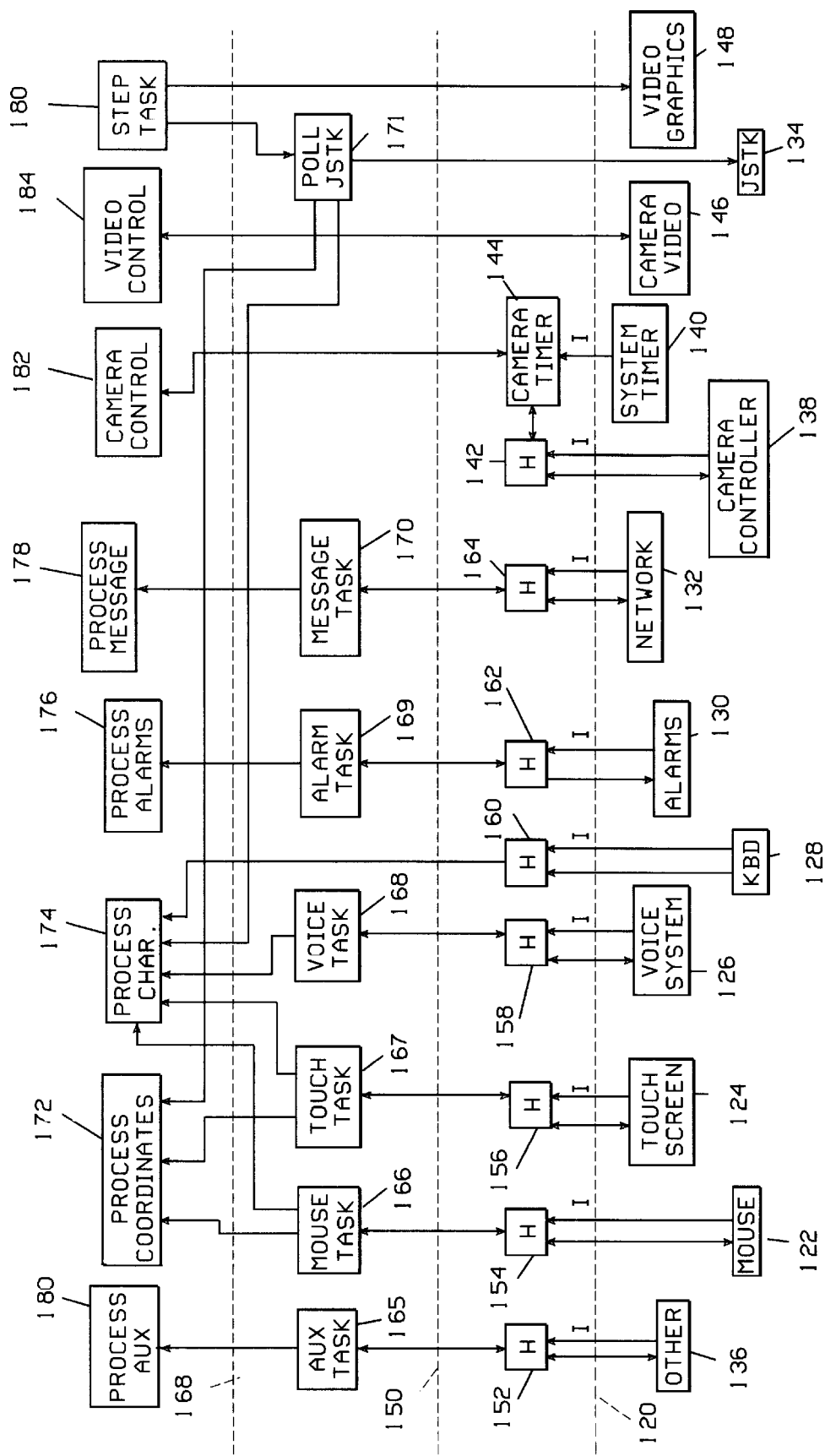
FIG. 4 is a combination block diagram and flowchart showing an overview of the present invention.

An example of one implementation of Applicants system utilizes an IBM PC type data processor with an INTEL type 486 microprocessor clocked at 66 Mhz, and provided with 12 megabytes of volatile memory. Hardware "cards" may be added to support communications, networking, voice, video and a joystick. A standard MICROSOFT DOS (TM) operating system is used, such as version 6.2, and is supplemented by a real time multitasking system from INFORMATIC, GmbH of Hamburg, Germany. Another implementation is available that does not require multitasking. When the system is initiated, the command line is processed, the operator's password is verified, tasks are initialized, files, such as a log file, are opened, and other files, such as system files, display files, camera files, and menu files are read. Devices, such as a voice system, video system, networking system, touch screen monitor, camera controller, mouse, and joystick, along with any auxiliary system that may be coupled to the processor are initialized, and if desired, cameras are automatically parked. Following system startup, the processes of FIG. 4 are initiated.

THE HARDWARE

Figure 1:
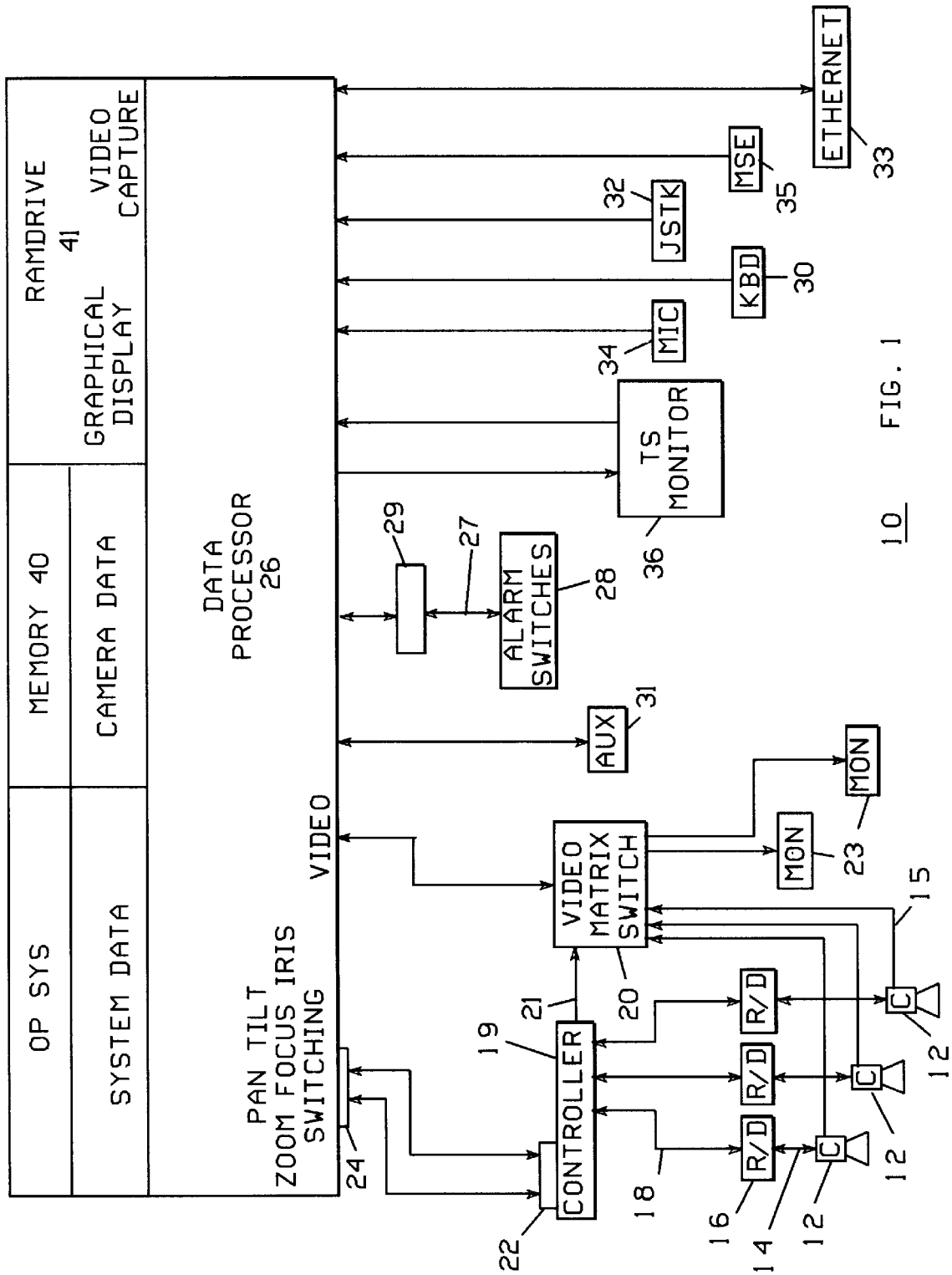
FIG. 1 is a block diagram of a surveillance system as contemplated by the present invention.

Referring initially to FIG. 1, a camera control system 10 illustrative of one example of a system of the present invention is shown. Here, a plurality of cameras 12 are mounted in areas to be watched from a remote location, such as a camera control room in a gambling casino. While only three cameras are shown by way of example, in a typical application there may be hundreds of cameras. Some of cameras 12 may be fixed cameras providing a stationary view, or may be of a type having pan and tilt capabilities, and lenses having zoom, focus, and iris adjustment capabilities. Significantly, the vast majority of such cameras may be the less expensive, manually operated type, having no provisions for providing electrical feedback signals to indicate position of the pan and tilt mechanisms. It is to be noted that while the present invention utilizes cameras having a CCD focal plane array, any type of camera may be used.

Each of cameras 12 has a plurality of electrical conductors 14 for controlling camera functions via a conventional receiver/driver 16, such as part number 1641, manufactured by American Dynamics of Orangeberg, N.Y., and further including a video conductor 15 for providing a video output from cameras 12 to a video matrix switch 20. Receiver/drivers 16 are each in turn coupled via a plurality of conductors 18 to a conventional camera control system 19, such as part number 2150, also manufactured by American Dynamics, which control system providing control signals to the receiver driver. In addition, the camera control system 19 provides control signals 21 to the video matrix switch 20 that determine which cameras are dislayed on monitors 23 and provided to the data processor 26. In some instances, the video matrix switch may be integrated with the camera controller, as in the aforementioned part number 2150. The camera controller 19 is typically coupled in the prior art to a manually operated keypad/joystick specifically designed for camera control. However, in the instant invention, keypad port 22 is coupled to a serial port 24 of a data processing unit 26, which may be an IBM PC type data processor. Data processor 26 functions to send camera control and switching commands to the camera controller 19 responsive to automated routines in processor 26, and receive manual commands that originate from interface devices such as keyboard 30, joystick 32, microphone 34, mouse 35, and touchscreen monitor 36. Additionally, processor 26 interfaces with other external systems, such as alarm switches 28, any auxiliary system 31 that may be coupled thereto, and in some instances a local area network 33, such as an ETHERNET type system.

In somewhat more detail, video signals from selected ones of cameras 12 are provided by video switching matrix 20 to data processing unit 26 responsive either to one of the automated data routines in data processor 26 or to a manual selection effected by an operator. Where there are a plurality of surveillance locations or operator stations, as in a gambling casino, the data processor 26 in each station may be connected by means of a local area network 33, as will be further described.

Data processor 26 is provided with nonvolatile memory storage conventionally containing an operating system. Additionally, nonvolatile memory storage is provided for storing system data and associated files necessary for the camera control system to operate. At least some of these files may be loaded into random access memory (RAM) 40 after initialization of data processor 26 to provide rapid access thereto, these files containing camera data as well as other data necessary for such functions as locating entities of interest, files relating to events/alarm data, and data for tours.

While an IBM PC type data processing system is contemplated for use with the present invention, it should be apparent to those skilled in the art that any general purpose computer and operating system of sufficient capability may be used. Additionally, while the programming language selected for the disclosed embodiment is Borland C++ version 3.1 (™), it should also be apparent that other programming languages are suitable for this application.

As described, external systems such as alarms 28 and an auxiliary system 31 are coupled to data processor 26. Here, alarms typically originate from discrete devices such as strategically placed alarm switches 28 that monitor opening or closing of doors and windows, "hot" keys from cashiers, fire alarms, and the like. These alarm inputs are interfaced to data processor 26 by an alarm interface unit 29, which constantly polls the state of the alarm switches. In the event that one of these alarms is activated, alarm interface unit 29 provides an indication of the type of alarm and its location. When an alarm occurs, processor 26 automatically interrupts normal operations and alerts the operator, makes an entry into a log file and, if required, directs a camera or cameras to a field of view including the source of the alarm. Further yet, by constantly polling the exchange of signals (handshaking) that occurs between the alarm interface unit and the data processor, processor 26 will detect if the alarms are made unavailable, as by equipment failure or tampering.

As an additional, novel type of alarm, a "camera watch" alarm is included wherein one or more cameras may be set to monitor one or more video fields, with any change in the monitored video field, such as a person walking thereinto, causing an alarm to be triggered and interrupting the normal operation as described. As before, a log entry in nonvolatile memory is created responsive to the alarm, such entry including time of the alarm and name of the surveillance operator informed of the alarm. The "camera watch" type of alarm eliminates the necessity of installing a plurality of switches, motion sensors, and the like in areas to be monitored for intrusion, such as coin counting rooms, storage areas, etc, with this function more effectively being provided by surveillance cameras.

Inputs to data processor 26 may be provided by operators using several types of interface devices, including a conventional keyboard 30 and joystick 32 coupled to the data processor via a port. These devices may be used to control the position of a cursor on either a graphic diagram or camera video, or to conventionally effect pan and tilt movements of a camera while the operator observes surveillance video on a monitor. For allowing an operator to maintain visual contact with a surveillance monitor while initiating camera commands, an audio input from a microphone 34 is provided, so that the camera operators need only to utter command words or phrases to evoke the desired response from processor 26. One such audio system, part No. 92F3378, available from IBM (™), has been shown to operate well in this application. Additionally, a touch screen monitor is used in the instant invention to control camera movement and provide processing commands. This monitor displays a graphical view of the floor plan of the area being surveilled as well as camera video, and allows the operator to use the touch screen to direct cameras to view locations relative to either a graphical view of the area being surveilled, or live video, or both.

As the video graphic displays must be updated synchronously with camera movements, and on a large scale, a CADD drawing of a view of an area, such as an entire floor of a casino as seen from above, may be stored as a bit map in RAM memory of the computer, which may be configured as a ramdrive 41 (FIG. 1), in order to rapidly access the view. Likewise, a plurality of more detailed views of portions of a large area view may also be stored in RAM memory so that an operator may "zoom in" on the more detailed views from the large area view. In some instances, overlap of the more detailed views is required to provide an operator with continuity when viewing a moving individual or object. Associated with each bit map (PCX file) is provided information about the coordinates of the boundaries of the display (PCY file) that is used to relate locations on the bit map to the cartesian coordinate system used to control the cameras.

Figure 1A:
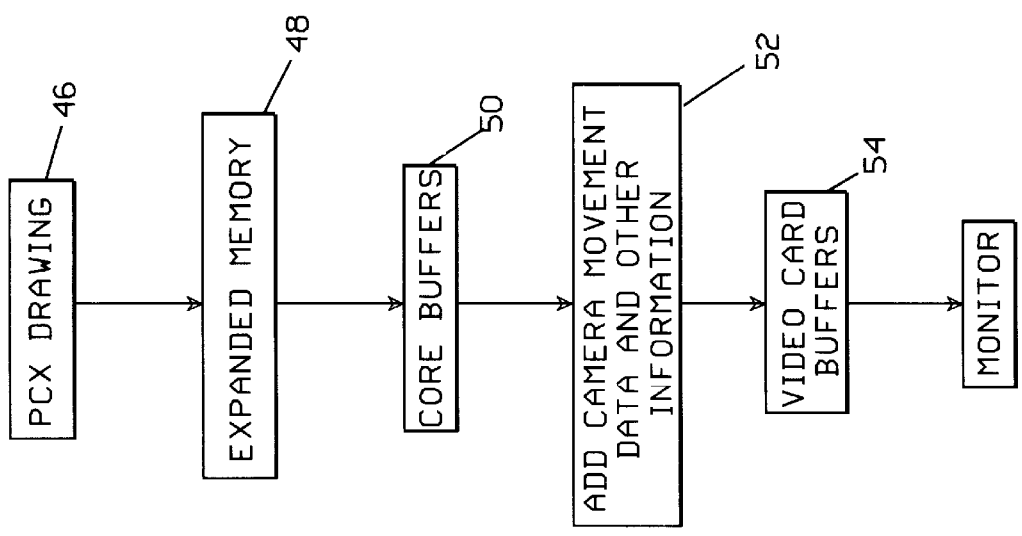
FIG. 1a is a block diagram illustrating movement of graphic video data from a bit-mapped drawing to a video card driving a monitor.

As shown by box 46 of FIG. 1a, the graphical display of an area being surveilled may be loaded in bit-mapped format into data processor RAM, such as in an expanded memory page 48 as defined by LIM4.0. For each display update, the graphical display is copied into a core buffers 50 having red, blue, and green intensity planes, after which is added information to illustrate camera movement, cursor location, operator messages, system status and menu bars, as shown by box 52. This information is loaded into a video card memory 54, and is then applied to a monitor. A camera view polygon is generated, and synchronized with camera movement by using commands that are used to control camera movement, without relying on feedback from the camera system. Here, by knowing the focal length of the lens, current zoom factor, height of the camera above the floor, and angle of pan and tilt of the camera, the camera view polygon may be adjusted to reflect an actual field of view of the camera as projected on the floor of the respective area being surveilled.

Figure 1B:
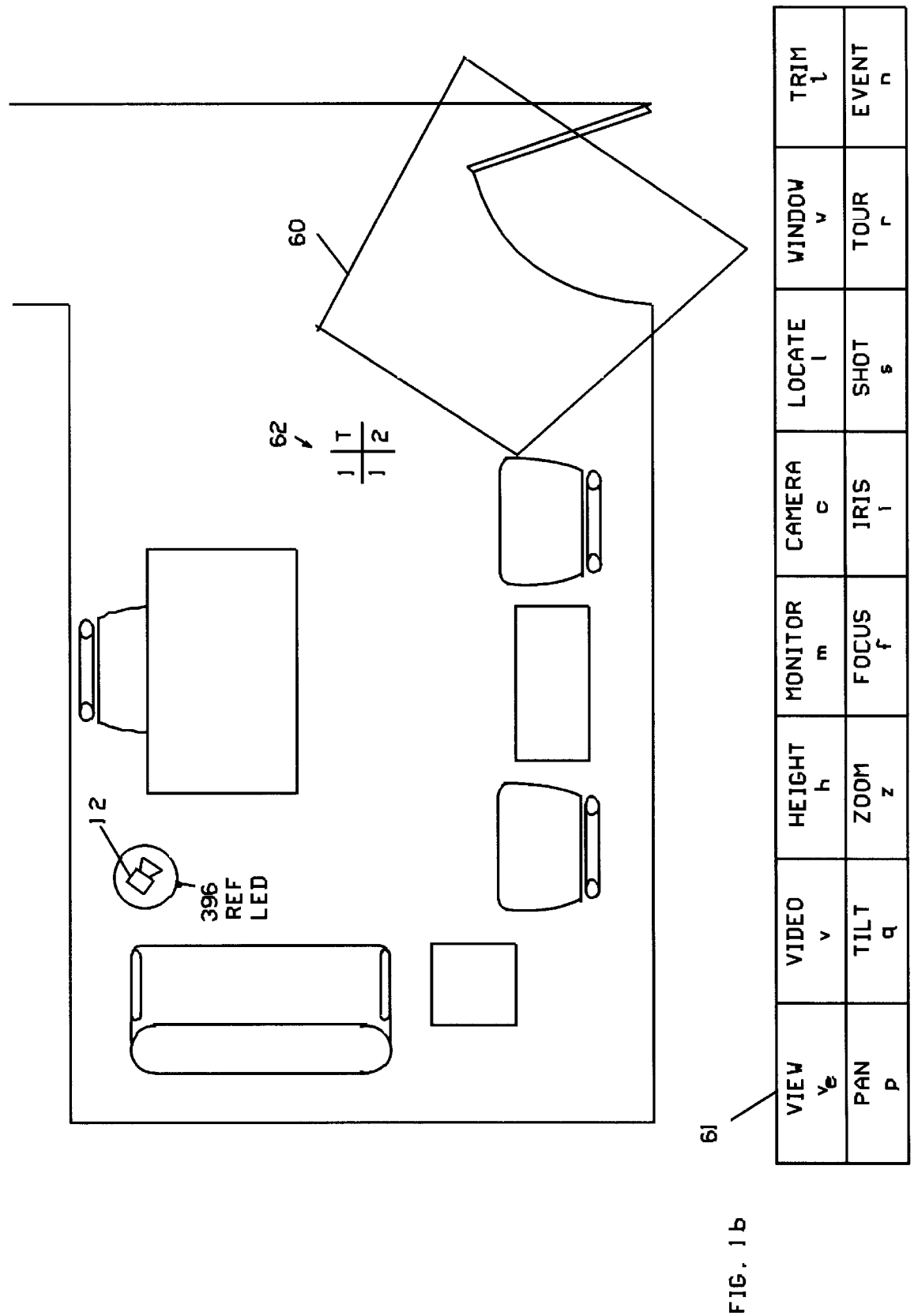
FIG. 1b is an example of a graphic representation of a view of a monitor of the present invention showing certain details including location of entities in a surveilled area and a menu bar of a touch screen monitor.

As shown in FIG. 1b, a detailed room map is shown, which is taken from a larger area map. The representation of the camera view is provided as polygon 60, with the view being projected on the floor of the area viewable by the camera. In addition, a menu bar 61 displayed on a lower portion of the touch screen provides the operator with a selection of commands to operate the cameras and computer system without requiring use of the keyboard. Also, at symbol 62, an indication of the boresight view of the camera lens, the camera and monitor ID, and camera status is provided, such symbol being movably responsive to the height (focus) above the floor currently being viewed, as on the top of a table. For example, when camera 12 is focused on the floor, symbol 62 is in the center of polygon 60, and when the focus is moved up, symbol 62 moves toward camera 12 proportional to upward extent of the focus.

THE SETUP PROCESS

Figure 2:
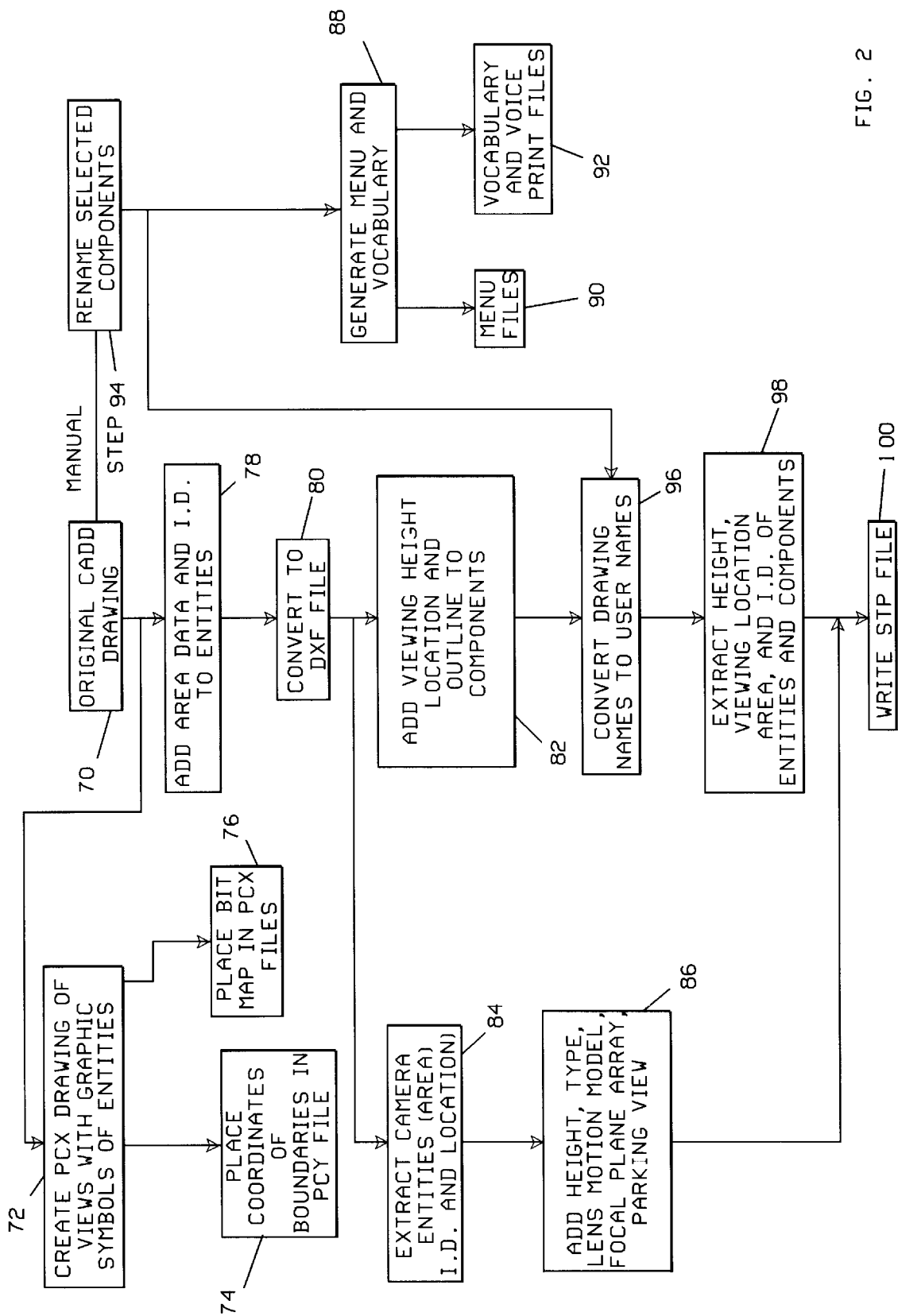
FIG. 2 is a flowchart illustrating a method of modification of a CADD drawing as implemented by the present invention.

Prior to installation of the system at a particular site, and as shown in FIG. 2 at box 70, files containing drawings of a scaled floor plan in a precisely defined Cartesian Coordinate format are prepared with a commercially available CADD (computer assisted designing and drawing) program, which files containing all areas which may be imaged by one or more surveillance cameras. These CADD files are typically architectural files used by the installation, or CADD drawings prepared for Applicants system. In these files, commonly known as vector files, every point in the scaled drawings can be referenced to coordinates of a vertical Y axis, a horizontal X axis and height above the floor, and has precisely known locations. Particular data from the CADD drawings, such as locations of objects or areas of interest, is utilized in a setup process to generate files necessary to reference camera movement.

In particular, the borders of any area within the overall drawing are provided using the vertical Y axes and horizontal X axes convention and scaled using an commonly accepted unit, such as inches or meters. As such, any point in the large area views or smaller detailed views is locatable in terms of X and Y coordinates from the CADD drawing. These views are extracted from the CADD drawings and stored as bit maps in a particular format, such as the PCX format defined by PC-PUBLISHER, and as illustrated by box 72. In the setup process, boundary coordinates of the respective PCX bit maps of the desired views are stored as files designated PCY, as indicated at box 74, with the PCX bit maps stored in a file as indicated at box 76. During use, and as described above, these files may be stored in RAM memory for rapid access to reduce time required to switch between views. Alternately, the large area views and smaller detailed views may be stored in different formats, and retrieved as necessary during use.

Each component, such as a slot machine, becomes a discrete entity of the CADD drawing when coordinates for location of the component reference point, and rotation and scaling factors, if used, are specified. Additional information required by Applicants system, in the form of attributes, are appended to the entity information for each entity. As shown in box 78, these attributes include an identification reference attribute, such as a number, which uniquely identifies a particular entity from a plurality of like entities, such as doorway 1, doorway 2, doorway 3, and so forth. A viewing area reference attribute, which also may be a number, is also appended to each entity, and specifies the physical area wherein the entity is located, such as floor 1, floor 2, etc. The component and entity information, in addition to the appended attributes, are converted to a data file, which may be in a DXF format as shown in box 80, the DXF format being a widely accepted format compatible with most CADD programs, so that drawings made by different CADD programs will be compatible with Applicants system.

At box 82, additional information is appended to particular components making up the entities in the DXF file for viewing each component in a particular manner. These additional attributes specify a viewing height from a known reference, such as from the floor, at which a camera is to focus, and a boresighted viewing location about which the view is centered. Additionally, an area around the component is designated as a component identification outline, for referencing the camera view with respect to the component. This is useful to a surveillance operator, who can make the inquiry as to where a particular camera is viewing, and the system will respond by identifying the nearest component and the distance from the component, or if the component is being viewed directly. For example, for a component such as a slot machine type 1 having a fixed seat associated therewith, the viewing height may be specified as 40 inches from the floor, and the boresight viewing location may be specified as a point between the seat and slot machine so as to provide an optimum view of both the player and the slot machine. As such, when a surveillance camera is instructed to locate a particular one of a plurality of this type slot machine, the particular machine will initially be viewed at the particular height and at a particular location as specified by the component height and location attributes. When the camera is moved so that the boresight of the camera view is misaligned with the viewing location, the identification outline provides information relating to whether the slot machine is still being viewed.

Cameras are a particular type of entity, and are treated differently from the viewed entities. Here, the area, identification, and location coordinates for each camera entity are extracted from the DXF file, as shown at box 84. At box 86, information is appended to the camera entity data for each camera, which information including camera model and type, height of the camera above the floor or other reference surface, location of motion stops, a parking view to which the camera is initialized or returned, data relating to the focal plane array, lens and camera zoom/focus/iris motion, and data relating to the motion of the pan and tilt mechanisms of the camera mount system. With respect to the camera lens and pan and tilt mechanisms, motion models of each particular camera type include amount of backlash when reversing directions, and parameters that reflect the acceleration/deceleration of these mechanisms, and maximum speed. Zoom information reflects minimum and maximum focal lengths, focus information provides the minimum focal distance, and iris information provides a range of adjustment with respect to light levels.

Menus related to operation of input devices, such as the vocabulary for voice control, which includes verbal commands such as "pan", "locate", "focus", etc, and coordinates for the corresponding buttons on the touch screen monitor, are generated in box 88, and stored in respective menu and vocabulary files, as indicated by boxes 90 and 92. At box 94, which may be a manual step, user friendly control names, such as "slot", are provided to replace a CADD name such as ST-35.

At box 96, the CADD names of components having the appended information from box 82 are converted to the new names from box 94, and the renamed, appended component information applied to box 98. Here, for each entity, the identity reference and area designation, height and location at which to view the entity, and component identification outline are extracted from the DXF file and written to a setup file, designated STP, at box 100. In addition, camera data is placed in the STP file, as well as certain information specific to the surveillance station of the data processor, such as surveillance station number and assigned monitors.

CAMERA MOTION MODELING

Closed loop systems, such as that proposed by Morgan, do not require accurate models of the camera dynamics but do require complex and expensive camera systems that are able to monitor their states (pan, tilt, zoom, focus and iris) and report these states to the controlling system. Applicant's open loop system, on the other hand, must predict camera dynamics based on motion models in order to know the state of a camera. This is true for cameras without presets, and also for cameras with presets when using the camera to observe scenes that are not located precisely at one of the preset views. For cameras without presets, the estimate of a camera state will diverge over time from the true camera state, meaning that the estimated and true state must be periodically realigned. Accurate models are required in order to minimize the frequency of periodic realignment.

Initially, the motion models of the cameras and lenses must be determined from either equipment manuals or manual testing, and these parameters stored in the STP setup file. Determination of the rates of zoom, focus, and iris may be accomplished simply by measuring the time interval between the minimum and maximum extents of the function being measured. For instance, to obtain the time interval for the zoom function, the lens is moved to its widest field of view, and the zoom function activated until the nearest field of view is obtained, with this time interval being measured. As some lenses have been found to have differing rates between zooming in and zooming out, the reverse procedure is also required. A like process is used to determine focus and iris rates of the lenses. Backlash is estimated by determining play or excess movement during reversal of direction of the mechanism under test.

Determining the pan (azimuth) and tilt (elevation) parameters may be accomplished manually, as by attaching a laser pointer to the camera and directing the camera toward a wall. The camera is then moved in pan and tilt directions for precisely timed intervals, with the distance traversed by the laser spot being measured after each movement, as by a surveyor's theodolite. In this manner, terms reflecting acceleration/deceleration, backlash and maximum speed may be estimated and provided in a data file, which is subsequently used during operation of the system to estimate camera movement.

A more precise method for refining these parameters involves use of a least squares search to estimate the terms of the motion model. Here, as with the zoom function described above, tilt (and possibly pan) parameters may be dependent on direction. Additionally, precise values for the backlash in the drive mechanisms for the pan and tilt functions of each camera must also be determined.

Figure 3:
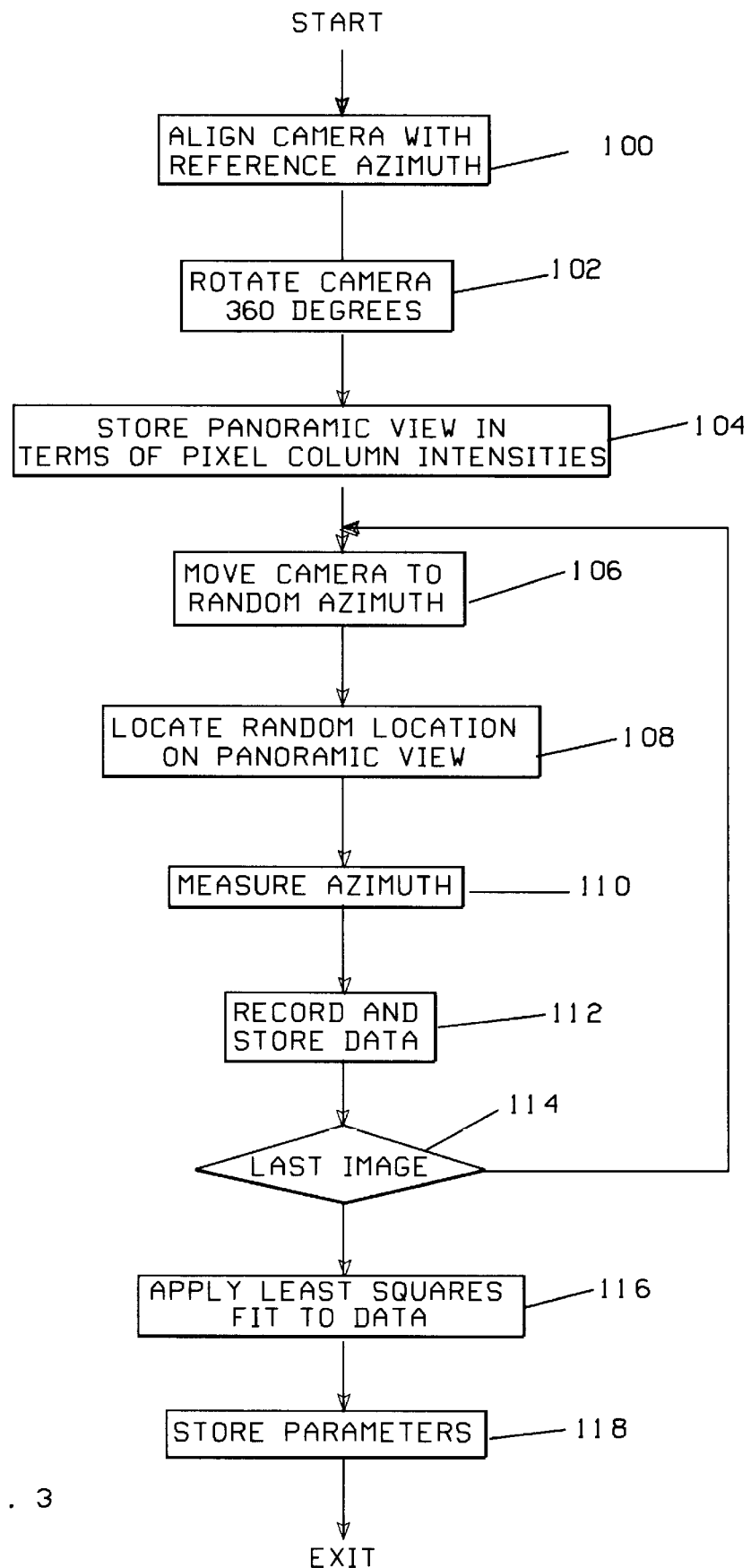
FIG. 3 is a flowchart illustrating a calibration procedure of the present invention.
Figure 3A:
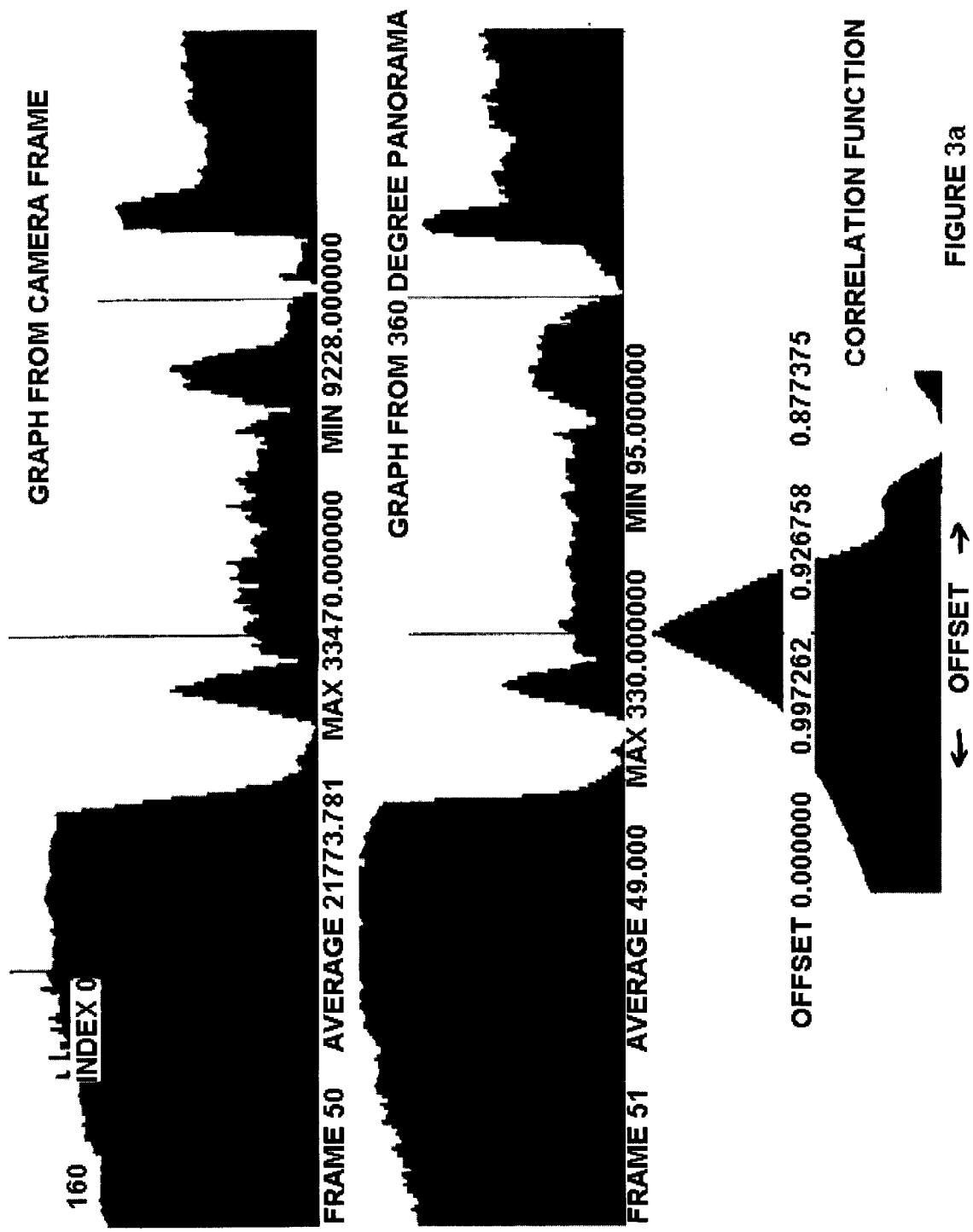
FIG. 3a illustrates an example of graphical representations of vertical intensity components of a panoramic view used to model camera movement parameters.

In this method of obtaining the pan and tilt model parameters, the camera is coupled to the data processor via a conventional camera controller and switching matrix as described above, with the data processor implementing the program shown in FIG. 3. Here, the procedure for determining parameters for the pan function is described, with a similar procedure used to determine the tilt parameters. For the pan function, and at box 100, the camera is set at an elevation where the scene is visually fixed, and the camera boresighted to a reference direction, or azimuth, such that the exact azimuth of the reference direction is known in terms of the system (or drawing) coordinates. At box 102, The camera is then directed to perform a 360 degree azimuth rotation (assuming that there are no azimuth stops) in discrete steps and record an image at each step, each image being stored as a vertical intensity graph wherein intensity values of pixels making up each column in the panoramic view are summed, an example of which being shown in FIG. 3*a*. In this sample graph, the greater the sum of the intensity values for a column of pixels, the higher the bar on the graph. By piecing together the overlapping portions of adjacent images, a contiguous, 360 degree, vertical intensity image is created starting and ending at the reference azimuth, as indicated by box 104. With knowledge of the total number of columns of pixels in the panoramic view, any particular camera view at the given tilt angle may be located in azimuth by using a conventional correlation function (FIG. 3a) to compare the image with the panorama. For tilt or pan systems that contain motion stops, the panorama encompasses views between the stops.

To refine the parameters of the motion model, at box 106 a series of random maneuvers may be conducted. At the end of each maneuver, the video image is captured, and exact azimuth is obtained from the panorama as described above at boxes 108 and 110. This series of maneuvers should be large enough to encompass short and long rotations, as well as changes in direction. The data is stored at box 112 as a table of motor ON times, directions and azimuths. At box 114 the test is made as to whether the last image is taken, and if not, then the program loops back to box 106, after which the routine proceeds as described. If the last image has been is taken, then the program proceeds to box 116, where a non-linear least squares search is undertaken to obtain the model parameters that best predict the motion of the camera system by minimizing the sum of the squares of the errors between the predicted and measured azimuths. These parameters include backlash, and parameters that reflect acceleration/deceleration and maximum speed values for clockwise and counter clockwise rotations, and are stored as indicated at box 118. While the particular motion modeling is disclosed herein, other methods may be used. One method is to model motor torque, friction, and backlash directly, and incorporating these terms with mass of the camera to develop the model. Another way is to combine motor acceleration and deceleration terms into one term, and use this term in conjunction with constant motor speed to model camera movement.

SYSTEM SOFTWARE DESCRIPTION

FIG. 4 illustrates high level organization of one method of camera control of the present invention Here, external devices are shown below dashed line 120, and include mouse 122, touchscreen monitor 124, voice control system 126, keyboard 128, alarms 130, a computer linking system, such as an Ethernet type network system 132, and joystick 134. Provisions are made for connecting at least one auxiliary system or device to Applicant's system at box 136. Auxiliary system 136 may be another computerized system, an example of which being a tracking system responsive to a signal, such as an infrared signal, emitted by a transmitter worn by employees or attached to moving objects. In this application, Applicants system may be used to direct a camera responsive to the location of a signal from the transmitter being received.

With respect to camera controller 138 and system timer 140, these functions are handled through interrupt routines 142 and 144, as will be further described. Camera video 146 relates to images obtained from the video matrix switcher as described above, and video graphics 148 refers to the computer's display system, as in the particular graphics adapter used by the computer.

Between dashed lines 120 and 150 are shown interrupt handler routines 152–164, which are responsive as shown to the respective computer and external system hardware. These devices provide an interrupt signal, labeled I, that causes the interrupt handler routine to assume control of processor 26 (FIG. 1) and perform the particular function required to support the interrupting device. For instance, when touch screen 124 is pressed, a series of characters is provided to the data processor. Each character generates an interrupt to interrupt handler 156, which in turn makes the characters available to TOUCH TASK 167. TOUCH TASK 167 assembles the entire series and determines the location on the screen that the touch occured.

Likewise, when a character or command is received from the mouse, alarms, voice system, keyboard, network, camera controller, system timer or other interface, an interrupt is concurrently provided to activate the respective interrupt routine as indicated by lines I. These interrupt routines must perform their function quickly and return control of the data processor to the previously operating task.

Between dashed lines 150 and 168 is shown a level of processing wherein specific task routines 165–170 receive messages or portions of messages provided by the interrupt routines and where necessary, assemble portions of the message into a complete command or message to be further processed. At this level, commands and messages are compiled for the mouse, touch screen, voice system, alarms, network and other systems. Information from the joystick is obtained at 171 by polling the hardware 134, as opposed to an interrupt. The mouse or joystick may provide coordinate data to PROCESS COORDINATES 172 if the mouse or joystick is moved, or character data to PROCESS CHARACTER 174 if a button is pressed. The touch screen will normally provide character data unless it is being used to simulate a joystick, while the keyboard and voice system only provide character data. Alarm, network and other data are provided to their respective high level routines, PROCESS ALARM 176, PROCESS MESSAGE 178 and PROCESS AUX 180, respectively, as will be further explained. Also shown in FIG. 4 is a system update task (STEP TASK 180) that operates at a fixed frequency, for example ten times per second, also as will be further explained. Boxes 182 and 184 refer to camera and video system control functions.

CAMERA CONTROL FUNCTIONS

The Applicant's open loop camera control system operates by precisely controlling motor ON times for the pan, tilt, zoom, focus and iris motors, such times being predicted using the motion models described earlier. For example, a pan right of 10 degrees would require one half second for a camera that rotates at 20 degrees/second, ignoring backlash and acceleration/deceleration terms. The time is expressed in terms of computer clock interrupts, for example, 18.2 per second, and in the example above 9 interrupts would be required. This information, together with the required speed, if the camera has multiple speed capability, are provided to CAMERA TIMER 144 and a flag is set such that CAMERA TIMER 144 can determine that the command is ready for processing. This flag is necessary because CAMERA TIMER 144 operates at the interrupt level and executes independently of the camera control functions. Being triggered by the clock interrupt, CAMERA TIMER 144 has a high priority, assuring that it executes in a consistently timely fashion. In addition to movements of fixed durations, such as in acquiring a new pan angle, open ended movements may be requested, as in responding to a joy stick held in one position.

CAMERA TIMER 144 operates once each clock interrupt and cycles through a list of cameras that require motion, starting with the first camera, as shown in box 131. The associated command flags, e.g. pan, tilt or zoom, are then examined in box 133. If a flag is set, as inquired in box 135, indicating that a motion should be in progess, the command time is decremented and a count is incremented as shown in box 137, this count indicating the length of time a motor has thus far been on. These counts are used to update the system's estimated state of the camera (pan, tilt, zoom, focus and iris) and are analogous to the information provided by the cameras in closed loop systems. CAMERA TIMER then provides, in box 139, the camera controller interrupt handler 142 the necessary information to control the switching on and off of the necessary motors. If the motion is not open ended, as described above, a test is made in box 141 to determine if the motion has been completed and, if so, the command flag is cleared at box 143. When all flags for all active cameras have been examined, as indicated by boxes 145 and 147, the routine exits.

With regard to camera motion, there are two methods that are used by Applicants system, conventional motion and room relative motion. Conventional motion considers pan and tilt movements independently, whereas room relative motion constantly adjusts the relative rates of pan and tilt motion to accomplish a straight line trajectory of the lens boresight relative to the floor of the surface being viewed. Thus, with respect to movements initiated by the joystick, as an example of an input to PROCESS COORDINATES 172 (FIG. 4), there are two types of movements possible. A conventional response of the camera to moving the joystick to the right would be to initiate a pan right circular movement at a speed controlled by the degree of joystick displacement. In contrast, a room relative camera response to the same joystick displacement produces movement to the right relative to the floor plan in a straight line, as in following an aisle. Camera movement would stop when the joystick or other device was no longer activated.

In addition to joystick type motions are camera movements to acquire a view of a particular location. As with the conventional joystick motion and room relative joystick motion, movement from the initial view to the desired view may be accomplished by independent pan and tilt motions, or the pan and tilt motions coordinated such that the view provided by the camera moves in a straight line between the two views at a fixed speed. These operations are shown in FIGS. 4a and 4b.

Figure 4A:
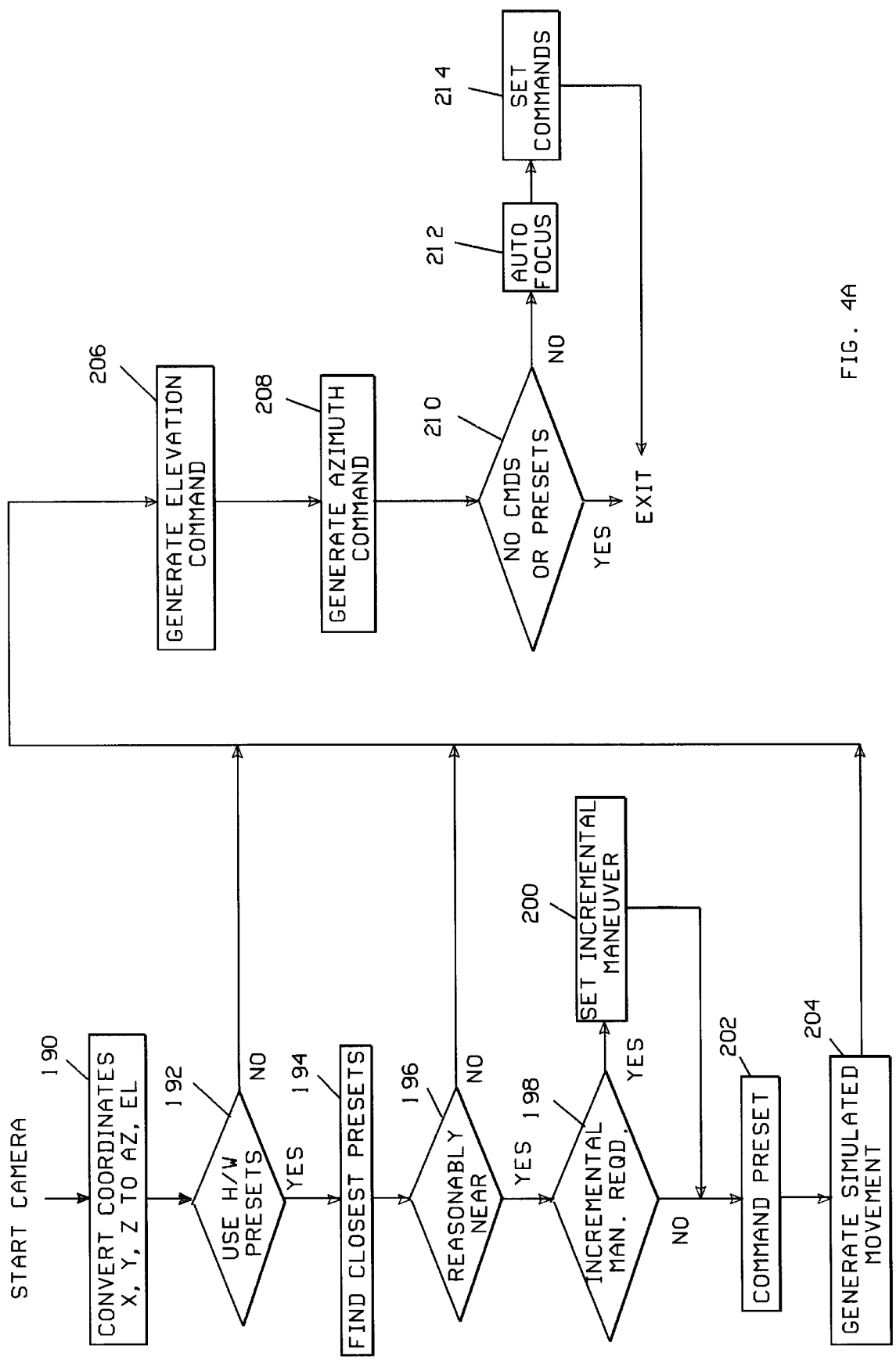
FIG. 4a is a flowchart showing a process by which camera movement is initiated
Figure 4B:
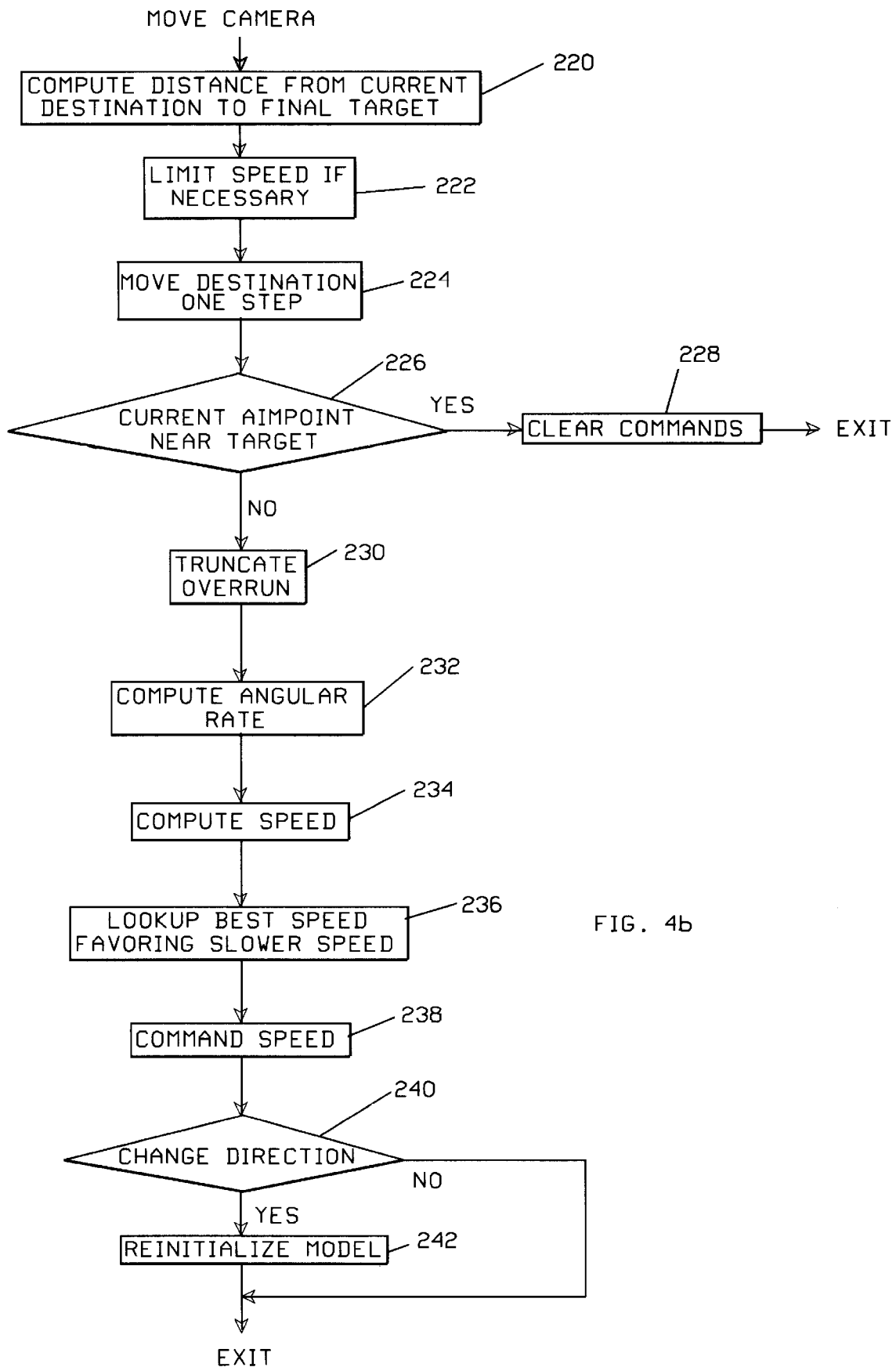
FIG. 4b is a flowchart illustrating room relative camera movement of the present invention
Figure 4C:
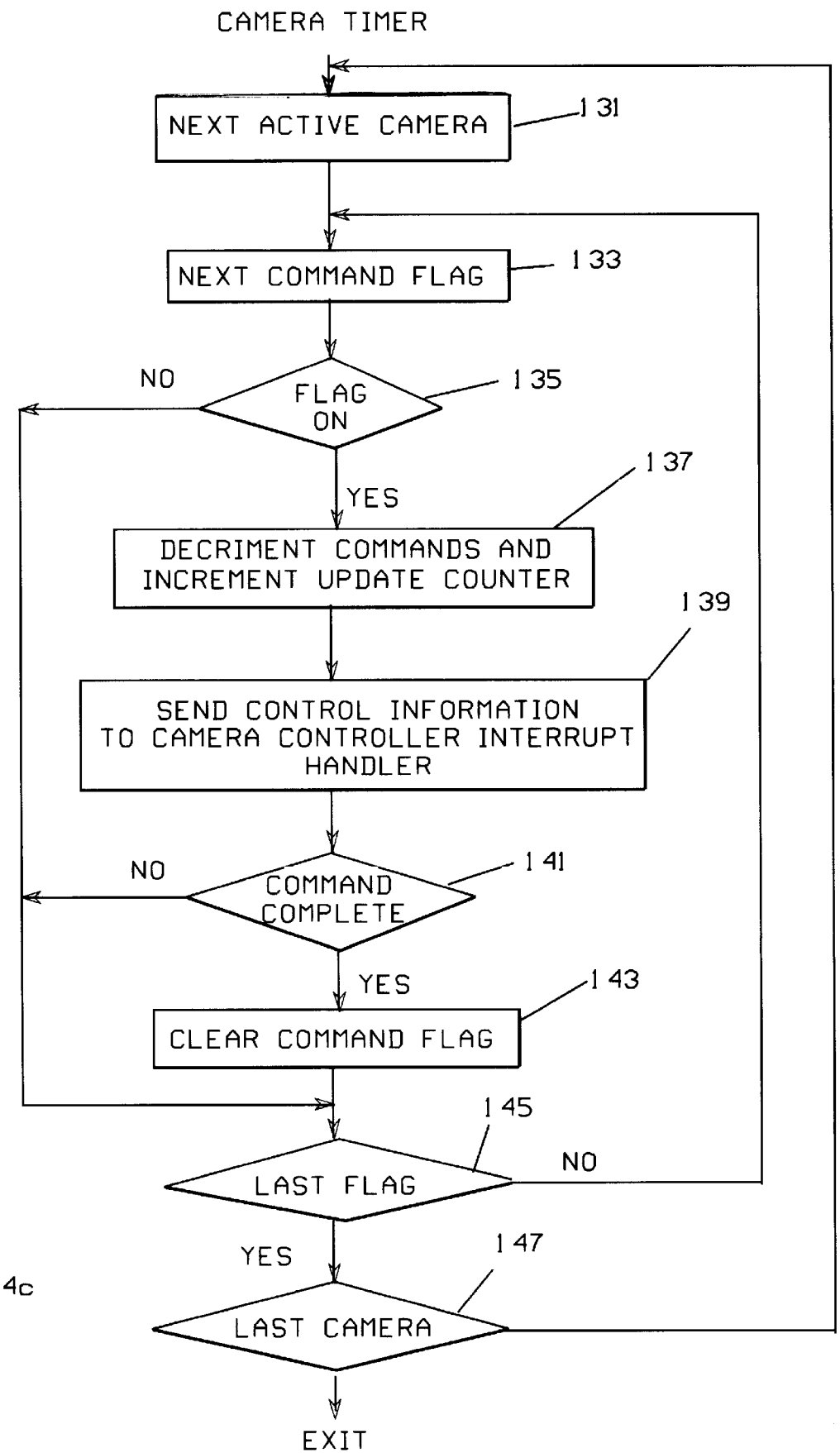
FIG. 4c is a flowchart showing a method for controlling camera motors.

In the flowchart of FIG. 4a, labeled START CAMERA, processing for conventionally moving a camera's view to a new location is shown. At box 190, the X, Y, and Z coordinates of the point to be viewed are converted to azimuth and elevation angles with respect to the camera. Here, azimuth is converted by:

Azimuth=arctan (X,Y), and elevation by:

Elevation=arccos $(-d\ Hp+/-sqrt(H^2\ (D-Hp^2)))/D$

Where d is the distance along the floor from the camera to the desired viewing location, Hp is the pivot offset (the distance from the camera lens to the camera center of rotation), H is the viewing height plus Hp minus the camera lens height, and $D=H^2+d^2$. The minus and plus signs are chosen if the camera is to be moved up or down, respectively.

Having thus obtained the angles of the point to be viewed with respect to the camera, the inquiry is made at box 192 as to whether a hardware preset is to be used, assuming a camera with hardware preset capability and at least one preset being set. The preset nearest to the destination is located as indicated at box 194, and the routine proceeds to box 196, where the inquiry is made as to whether the preset is reasonably near the selected point, for example where the preset is closer to the desired view than the current camera view. If the preset is reasonably near as described, then the program proceeds to box 198, where the inquiry is made if the preset is sufficiently close to the desired view such that no further maneuver is required. If not, an incremental maneuver will be required to move the camera from the preset view to the desired view, which incremental maneuver being set at box 200, after which the preset view is commanded at box 202. After the preset is commanded, the program falls through to box 204, labeled GENERATE SIMULATED MANEUVER. Here, the remainder of START CAMERA is performed to generate the commands necessary to simulate the motion of the camera, i.e. move camera view polygon 60 on the control monitor as the preset is being acquired.

If presets are not used, at box 192 the program uses the camera motion models to generate the necessary tilt and pan motor ON times at boxes 206 and 208, respectively, to move the field of view to the tilt and azimuth angles calculated in box 190. The routine then moves to box 210, where the inquiry is made to determine if no commands are required, or of a preset motion is being simulated, in which case the function exits. Otherwise, an autofocus calculation is performed at box 212 that considers the distance of the camera from the desired view. The necessary pan, tilt and focus commands are then sent to the camera controller 138 of FIG. 4 at box 214 and the routine exits.

In contrast, and referring to FIG. 4b, which describes room relative motion, when room relative motion is required, as in touring along an aisle, it is necessary to adjust the pan and tilt speeds constantly and in concert to produce a straight line motion at constant speed across an area under surveillance. It should be noted that as the tilt angle approaches horizontal, small increments in angle produce large displacements of the field of view. In calculating room relative motion, an imaginary destination is generated, the imaginary destination moving relative to the room. Where a specific target to be viewed is selected, then the imaginary destination is moved relative to the room to the target. Where room relative motion is initiated by the joystick or other pointing devices, the imaginary destination will move relative to the room responsive to the pointing device. If the moving destination is sufficiently close to the target, as calculated at box 220, that it will overrun the target in one control interval (e.g. the one tenth of a second STEP TASK interval) the speed is lowered, as shown at box 222. The moving destination is then advanced at the lowered speed for one computation step at box 224. The actual aimpoint of the camera is then obtained, and if it is sufficiently close to the final target, as inquired at box 226, the movement is terminated at box 228. If the actual aimpoint of the camera has overrun the moving destination, camera movement in the appropriate direction is temporarily suspended at box 230. The cartesian velocity is then converted to pan and tilt angular rates at box 232.

For some camera systems, a finite number of pan and tilt speed settings are available, eight being a common number. The setting providing a speed closest to the desired speed is chosen while favoring slower speeds to minimize overrun, as shown at box 236. The pan and tilt commands are then sent to the camera control system at box 238. If an angular rate must be reversed, as shown at box 240, the necessary model terms, e.g. backlash, must be included in the computation as shown at box 242.

OPERATOR INTERFACE

There are two types of data received from an operator, character information and coordinate information, the latter being obtained from such devices as a joystick or mouse, and in some instances from the touch screen.

Figure 5:
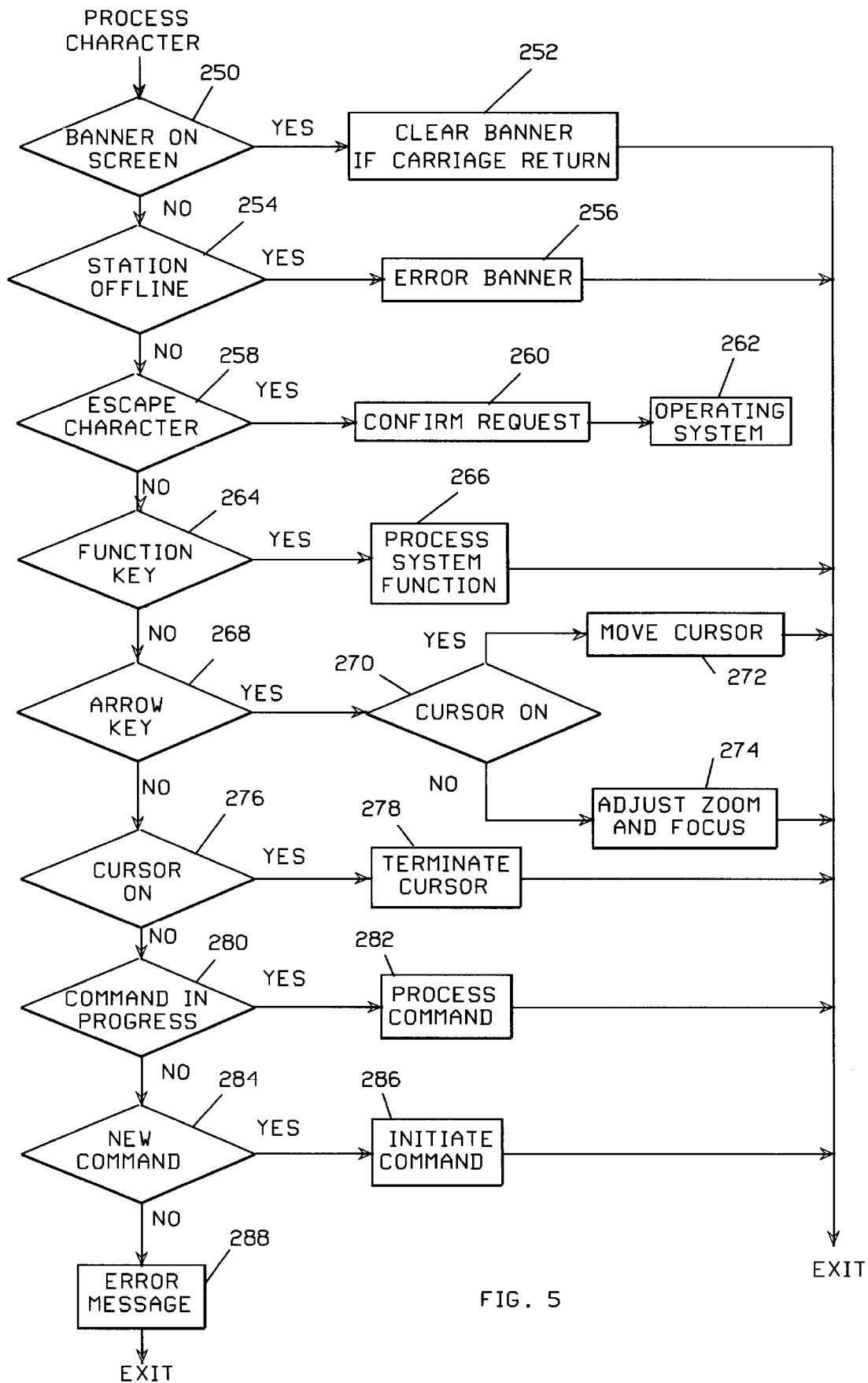
FIG. 5 is a flowchart illustrating how characters are processed.

With respect to the PROCESS CHARACTERS box 174 of FIG. 4, reference is made to FIG. 5. These characters are the standard set associated with the data processor, for example those associated with an IBM PC. In FIG. 5, at box 250, the inquiry is made as to whether a banner, or message to the operator, is currently being displayed, in which case the only character accepted is a carrage return, which will acknowledge and clear the banner at box 252. At box 254, if the station is off-line or in a standby mode, the only accepted character is a log on character, which must be followed by a password. Any other request will produce an error message, as indicated by box 256. At box 258 the inquiry is made as to whether the character is an escape character, which indicates intent to permanently or temporarily exit the system. If this is the case, and the user level of access is that of a supervisor, the user is prompted at box 260 to confirm the request, and if confirmation is made, the system exits to the operating system at box 262. At box 264 the inquiry is made if the character is one of the function keys (e.g. F1–F12), and if so, then the program provides the character to the appropriate system function routine indicated at box 266. If the character is an arrow character, as inquired at box 268, then at box 270 the inquiry is made if the cursor is ON, in which case the arrow character is used to move the cursor, as shown at box 272. If the cursor is OFF, then the arrow character is used to adjust either camera zoom or focus at box 274, depending on which arrow (left or right, or up or down) has been entered. Where the cursor is ON, as inquired at box 276 and a key is struck which is not a arrow key, the cursor operation is terminated at box 278. Where the cursor is OFF, the program proceeds to box 280, where the inquiry is made as to whether there is a command in process. If this is the case, then the character is provided to that command at box 282. If there is no command in process, then the program proceeds to box 284, where the inquiry is made as to whether it is the start of a new command. If this is the case, the new command is initiated at box 286. If the character is not related to a new command, then at this point an error message is initiated as shown at box 288.

With respect to system operation, the following table outlines some of the various commands that an operator may request of Applicant's system.

| COMMAND | ACTION |
| --- | --- |
| MONITOR | SELECT THE ACTIVE MONITOR. |
| CAMERA | SELECT THE ACTIVE CAMERA |
| LOCATE | LOCATE AN ENTITY OR LOCATION RELATIVE TO DIAGRAM OR VIDEO |
| WINDOW | LOCATE AND ZOOM IN ON A LOCATION |
| VIEW | SELECT THE DIAGRAM TO BE DISPLAYED |
| VIDEO | CONTROL THE PROCESSING AND DISPLAY OF CAMERA VIDEO |
| KEYPAD | CHANGE TO A MODE THAT IS OPTIMIZED FOLLOW A MOVING OBJECT |
| PAN/TILT | CAMERA MOVEMENT |
| MOVE | ROOM RELATIVE CAMERA MOVEMENT |
| TRIM | ALIGN THE CAMERA STATE |
| FOLLOW | HAVE ONE CAMERA FOLLOW THE VIEW OF ANOTHER |
| ZOOM/FOCUS/ IRIS | LENS CONTROL |
| PRESET | DEFINE AND CALL HARDWARE AND SOFTWARE PRESETS |
| TOURS | DEFINE AND EXECUTE TOURS |
| EVENTS | DEFINE AND EXECUTE ALARMS AND |

-continued

| COMMAND | ACTION |
| --- | --- |
| REPORTS | EVENTS INCLUDING WATCHES DATA GATHERING AND REPORTING SERVICES |
| OPERATOR | LOG ON A NEW OPERATOR |
| AREA/HEIGHT | CHANGE THE VIEWING AREA/HEIGHT |
| MESSAGE/NOTE | SEND A NOTE TO ANOTHER STATION OR PLACE IN THE LOG FILE |
| HELP/EXPERT | CHANGE OPERATOR INTERACTION MODE |
| AUXILIARY | SUPPORTS AUXILIARY FUNCTIONS |

Figure 6:
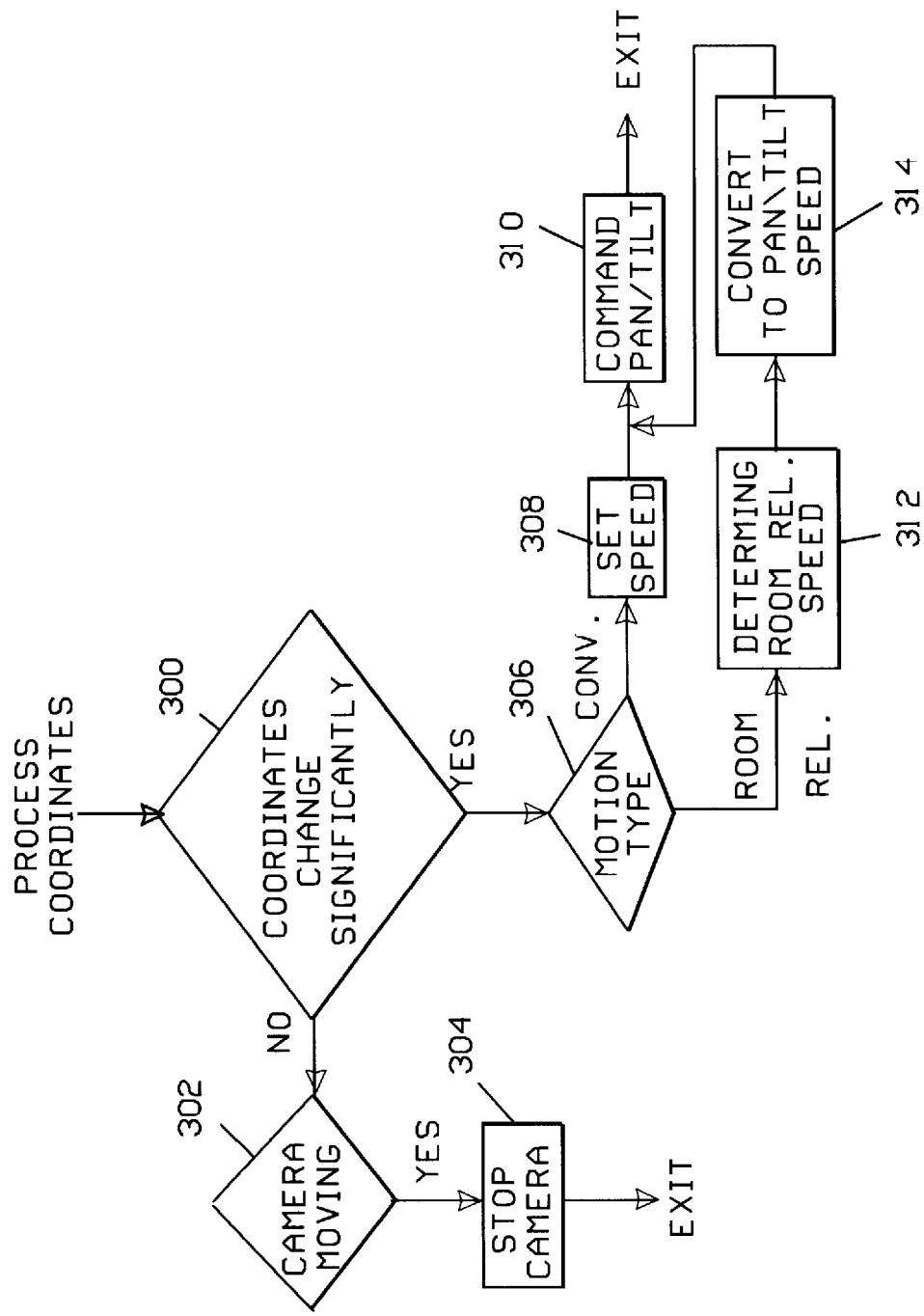
FIG. 6 is a flowchart illustrating processing of coordinates.

With respect to box 172 of FIG. 4, labeled PROCESS COORDINATES, a flowchart thereof is shown in FIG. 6. As described, these type of movements are manual camera movements performed by the operators using external pointing devices, such as the joystick. Here, at box 300, labeled COORDINATES CHANGE SIGNIFICANTLY, the inquiry is made as to whether the joystick or other pointing device is moved outside a null zone within which such devices will often drift. If the answer is no, then the subroutine proceeds to box 302 where the inquiry is made as to whether the camera is currently moving, such as when a joystick has been displaced and then returned to the resting position. If this is the case, the movement is terminated at box 304 and the routine exits.

Where the answer at box 300 is yes, the subroutine proceeds to box 306, where the inquiry is made as to what type of motion is requested, room relative or conventional. Here, conventional motion interprets left and right motions of the joystick to request the camera to pan left and pan right, and up and down as tilt up and tilt down, with the pan and/or tilt speed selected at box 308 on the basis of the degree of displacement of the joystick. The camera is then commanded to perform the requested pan and/or tilt movement at box 310.

Room relative motion defines left/right and up/down to be relative to the diagram of the area under surveillance, and is similar to MOVE CAMERA, as described above for FIG. 4b. The speed desired is interpreted to be the speed that the camera boresight traverses the floor of the area in a straight line, in, for example, inches per second. To perform room relative motion, variable speed cameras are required and the pan and tilt speeds must be individually adjusted to accomplish the desired floor speed in the desired direction at box 312, after which the room relative speed is converted to camera pan and tilt speeds at box 314. The resultant speeds are then commanded to the camera at box 310.

SYSTEM UPDATE FUNCTIONS

Many system functions are performed in response to an external event, as where the operator presses a button on the touch screen monitor, or a message being received from the network. A second class of functions operates continuously at fixed intervals in order to periodically update the system state and perform time dependent processing.

Figure 7:
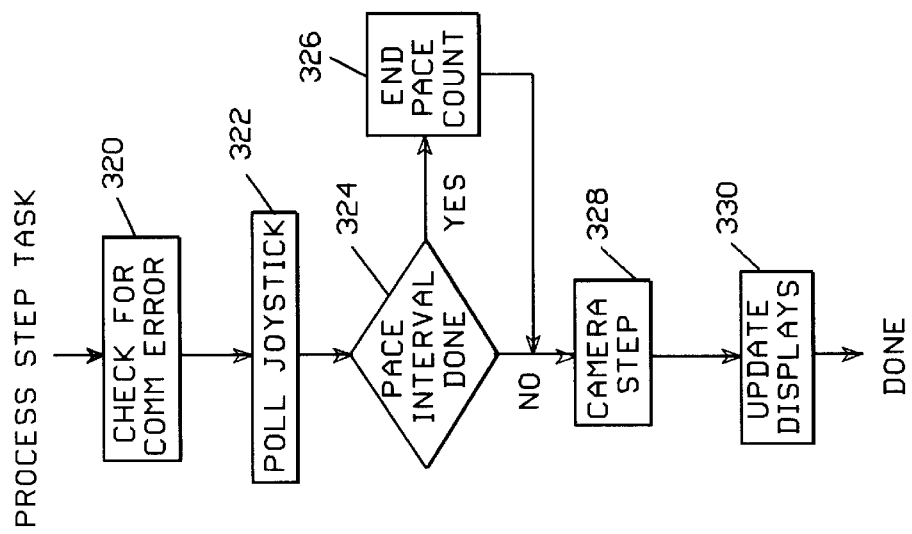
FIG. 7 is a flowchart illustrating a method of management of system update of the present invention.

With respect to FIG. 7, labeled PROCESS STEP TASK, which as stated is operated at a fixed rate, say ten times a second, (box 180 of FIG. 4), box 320 initially checks for communication errors that have been detected by the interrupt handlers described earlier. These interrupt routines are not capable of the complex response required by many error conditions (e.g. alerting the operator) and can only leave an indication of the error for a task that does not operate at the interrupt level, so that the this task can take the appropriate actions.

After the error check, polling of the joystick or other such device is indicated at box 322. If the joystick has been activated, the appropriate routine PROCESS CHARACTERS or PROCESS COORDINATES in called. A pace count may be accomplished by using the surveillance system to observe and count the number of times a specified event occurs, as in a cashier making change. In STEP TASK, an inquiry is made at box 324 as to whether a pace interval, if initiated, has expired. If so, then the pace count is ended at box 326 and the program proceeds to box 328. Where the pace interval has not expired, the program proceeds directly to box 328. At box 328, labeled CAMERA STEP, which is illustrated in detail in FIG. 8, the active cameras are serviced, after which the program proceeds to box 330, where the computer graphical display is updated as has been described in FIG. 1a.

Figure 8:
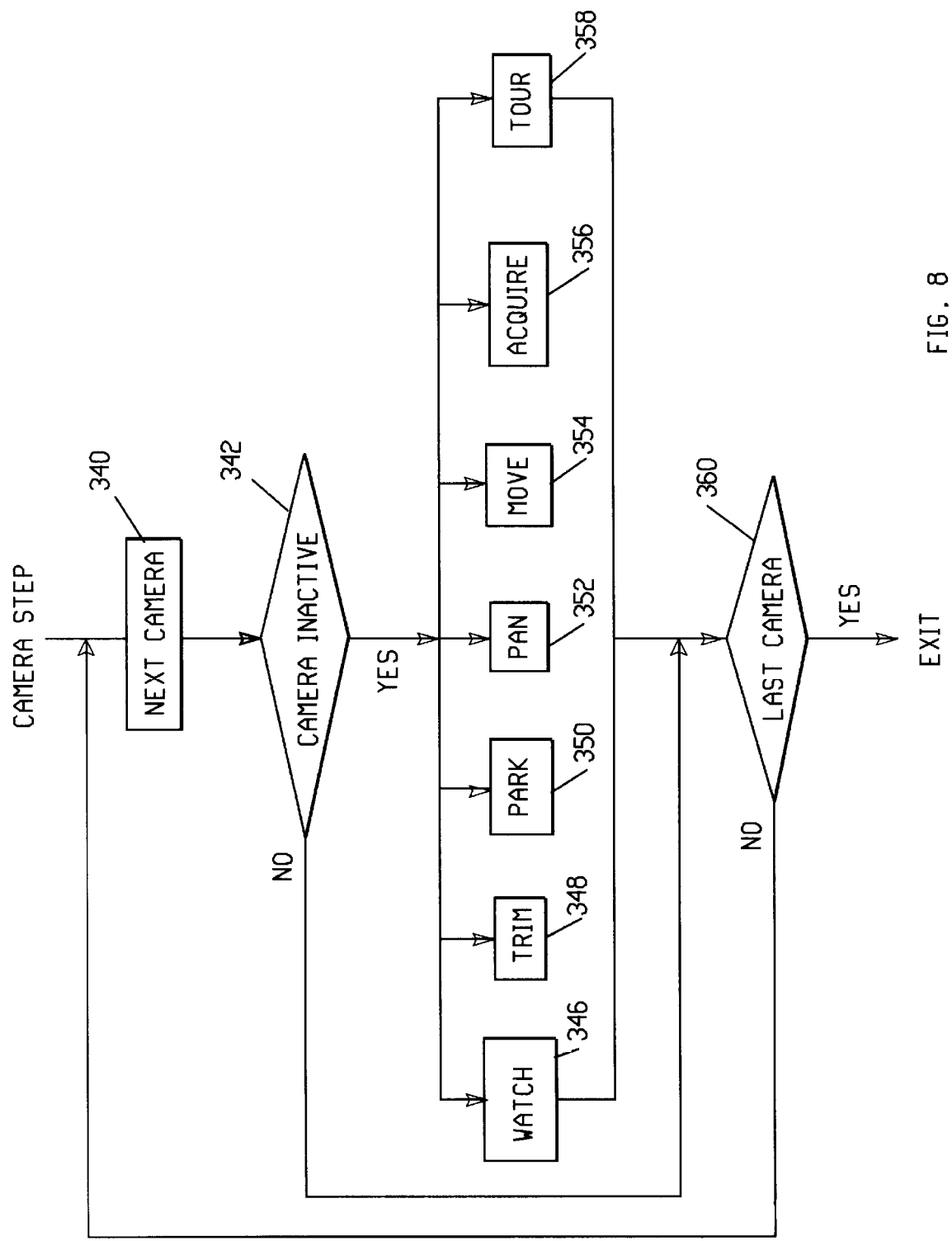
FIG. 8 is a flowchart showing a method of managing camera movement.

With respect to FIG. 8, labeled CAMERA STEP, the program initially proceeds to box 340, where all cameras will be examined, starting with the first camera. Each camera is checked as to whether it is active, as indicated at box 342. If a camera is not active, then no further processing is required and a test is made at box 360 to see if all cameras have been examined. Box 352, labeled PAN, only requires updating of the system to reflect camera movement. This update process uses the counts obtained from the CAMERA TIMER 144 and the motion models described earlier to update the current estimate of one camera state (pan, tilt, zoom, focus, and iris). With respect to box 348, labeled TRIM, an update is not required as this is a calibration function to align the computer system's estimate of the camera state with the actual camera view. Boxes 346, 350, 354, 356, and 358 reflect the more complicated functions WATCH, PARK, MOVE, ACQUIRE, and TOUR, respectively, which involve processing functions in addition to updating of the camera state, and will be described in detail.

FIG. 9 illustrates in detail WATCH box 346 of FIG. 8. In this instance, the update function is not required as the camera is assumed to be stationary. When the WATCH function is initiated, as a command in PROCESS CHARACTER, a reference image is stored in the form as described earlier wherein columns of pixels making up the image are summed so as to develop a brightness sum for each column. Periodically, at a specified interval, such as every second, a current image of the watched area is recorded, as indicated at box 370, and compared with the reference image as indicated at box 372. If the difference between the two images exceeds a preset threshold, such as a 5 percent difference, as inquired at box 374, then an alarm is triggered, as indicated at box 376, and a log entry is made at box 378. By considering the difference between columns of pixels, horizontal movement through a watched area is readily detected. Areas may be excluded from the watched image, such as an area within which a person is sitting, by excluding the columns of pixels encompassing the person from consideration in the difference process. Here, if anyone moves into watched areas on either side of the person, an alarm is triggered and an entry made in a log file.

Figure 10A:
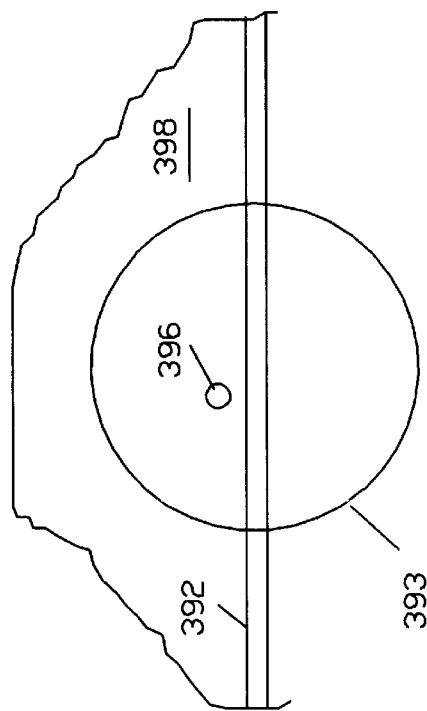
FIG. 10a is an illustration of placement of a LED for providing a video reference.

With respect to box 350 of FIG. 8, labeled PARK CAMERA, reference is made to FIG. 10 for a more detailed description. Here, after updating the camera state, the first inquiry at box 380 is whether the camera has been assigned a parking view. If no parking view has been established, then the routine exits. If a parking view has been assigned to the camera, then the inquiry is made at box 382 as to whether the parking view is a hardware preset. If the answer is yes, the hardware preset is called at box 384 and the routine exits. If the camera has been assigned a parking view which is a software preset, then at box 386 the camera is instructed to first acquire a reference view, which is a unique, stable, nonmoving scene, and may include a point source of light, as from reference LED 396 (FIG. 10a) positioned in a dark region 398, as in the inside of the camera housing as viewed from an upper tilt stop, the view indicated in dashed lines. If the reference view was not acquired, as inquired at box 388 (FIG. 10), then a search for the reference view is initiated as indicated at box 390. When the reference view is acquired, the alignment errors are removed from the camera state and the camera is commanded to return to the required parking view, as indicated at box 392. In the instance where a LED is used as a reference and is placed in a dark region as described at a known azimuth, only a few rows of pixels in the dark region 398 need to be monitored during the search, as it is immediately apparent when the camera encounters the point source of light. A mathematical centroid of the light source is calculated, and the camera azimuth can be determined from the location of the centroid within the image.

With respect to box 354 of FIG. 8, labeled MOVE, after updating the camera state, the process shown in detail in the flowchart of FIG. 4B is performed.

Figure 11:
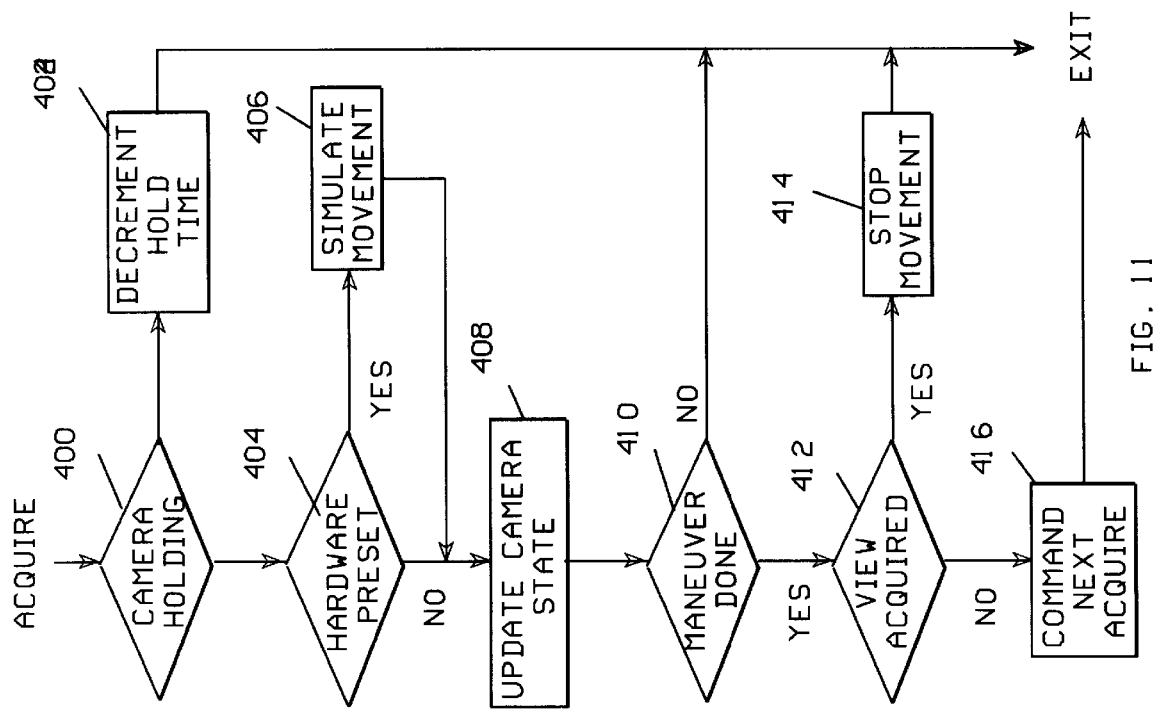
FIG. 11 is a flowchart illustrating a process for monitoring movement of a camera.

With respect to box 356 of FIG. 8, labeled ACQUIRE, reference is made to FIG. 11. This function monitors the movement of cameras that are set in motion by the START CAMERA function described in FIG. 4a. The first block 400, labeled CAMERA HOLDING, inquires if the camera is in a HOLD state, which is needed to provide a delay so as to insure that a camera in the process of acquiring a preset view completes the maneuver. Where the camera is in a HOLD state, the HOLD time is decremented by the time since the last inquiry, for example a tenth of a second, as indicated at box 402, after which the routine exits. If the camera is not in a HOLD state, the routine proceeds to box 404, where the inquiry is made as to whether a hardware preset is being used. If the answer is yes, then at box 406 simulated counts that reflect changes in the camera state are created as actual counts are not available from the function CAMERA TIMER 144. Polygon 60 on the display monitor is then updated at box 408 to reflect changes in the camera state. The routine then proceeds to box 410, where the inquiry is made whether the current maneuver has been completed, and if not, the routine exits. If the commanded current motion is finished, it is then inquired in box 412 if a subsequent incremental maneuver is required to complete the desired camera motion, as in using a preset to get near the final destination and then completing the motion without a preset. If the final view has been acquired, then movement of the camera is stopped at box 414, and the routine exits. If the view is not acquired, then at box 416 the camera is started for the next incremental maneuver, after which the routine exits.

Figure 12:
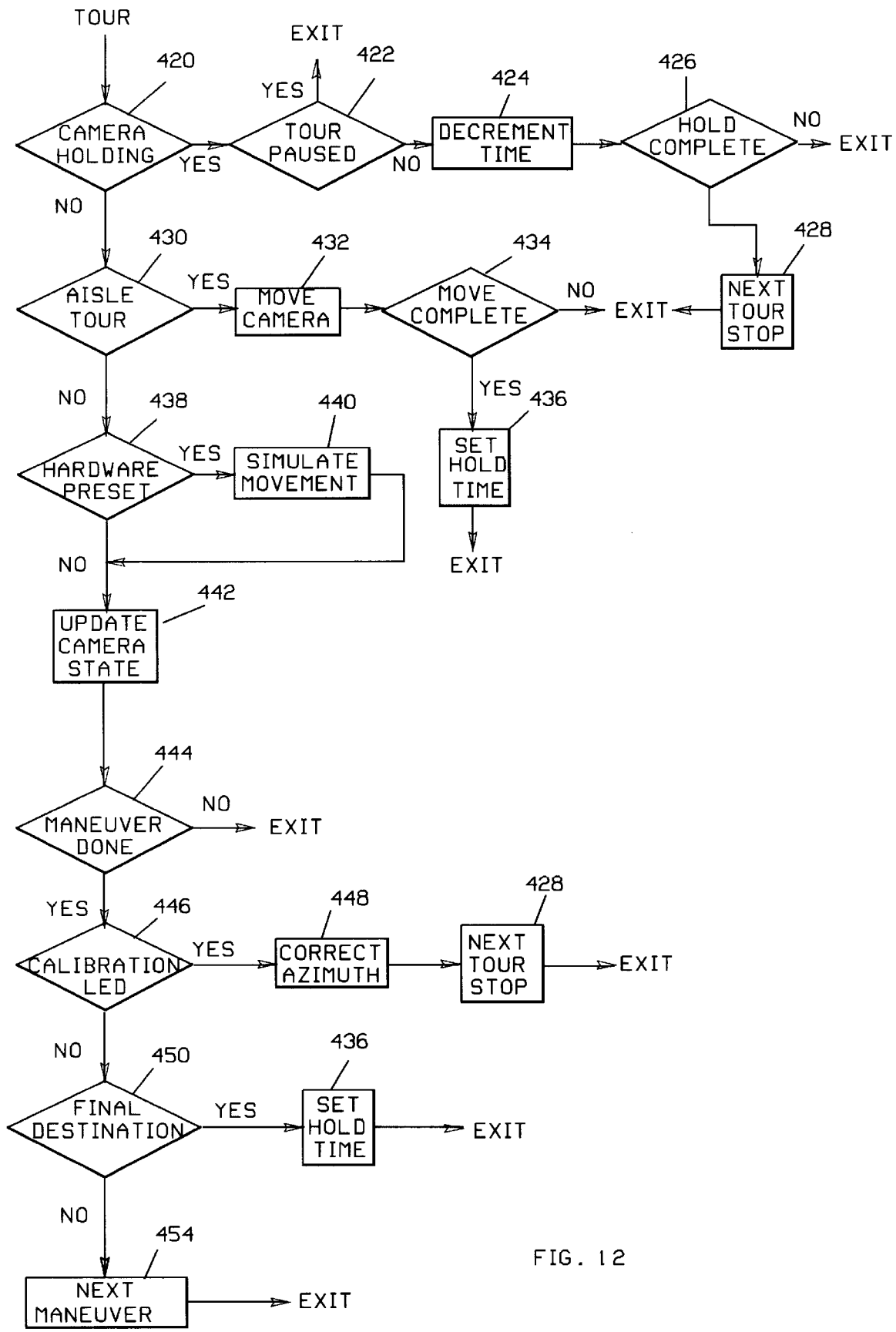
FIG. 12 illustrates a process for monitoring tours of the present invention.

With respect to box 358 of FIG. 8, labeled TOUR, reference is made to FIG. 12. Here, a tour is a sequence of views acquired sequentially by cameras having video routed in turn to a single monitor. Where possible, while one camera pauses at a stop in the tour, the next camera in the sequence may be prepositioned to its designated location so that the views may be switched immediately at the appropriate time. Each view along the tour is defined by specifying a camera, view, zoom and dwell time for that view. Additionally, the type of movement may be specified, as where a camera is to move in a room relative fashion, such as along an aisle, or conventionally from one view to the next view.

Initially, at box 420 the inquiry is made if the camera is holding at a particular view, as where the camera is delaying for the time set for that particular view. If the camera is holding, then at box 422 the inquiry is made if the tour has been paused by an operator, and if so, the routine exits. If the operator has not paused the tour, then at box 424 the holding time is decremented by the interval since the last computation, for example a tenth of a second, after which the inquiry is made at box 426 as to whether the hold time is completed. If not, the routine exits, and if the hold is complete, then the routine proceeds to NEXT TOUR STOP box 428 where the next stop in the tour is commanded. At box 430 the inquiry is made if the tour is an aisle tour, whereupon the camera is moved at box 432 directly along the specified direction using room relative motion as described for FIG. 4*b*. At box 434 the question is asked if the move is complete, and if not, then the routine exits. If the movement is complete, the hold time is set at box 436, and the routine exits. At box 438 the inquiry is made if a hardware preset is being used to acquire the next tour stop, and in this case the movement is simulated at box 440 as described above in FIG. 11. At box 442 the camera state is updated, either by actual counts obtained from CAMERA TIMER 144 or simulated counts obtained in box 440. At box 444 the inquiry is made at box 450 if the current maneuver is complete, and if not, the routine exits. Otherwise an inquiry is made at box 446 as to whether this tour stop is a calibration LED and, if so, the alignment errors are corrected as described for FIG. 10 at box 448. After correcting the azimuth the next tour stop is commanded at box 428. If the tour stop was not an alignment LED, the inquiry is made at box 450 as to whether an incremental maneuver is required, and if so, the next movement is commanded at box 454. If not, the camera is placed in the holding state for the appropriate delay at 436.

MISCELLANEOUS SYSTEM TASKS

As shown in FIG. 4, the system must interact with various external systems, in this instance alarms, network and auxiliary, as in the infrared transmitter system described earlier.

Figure 13:
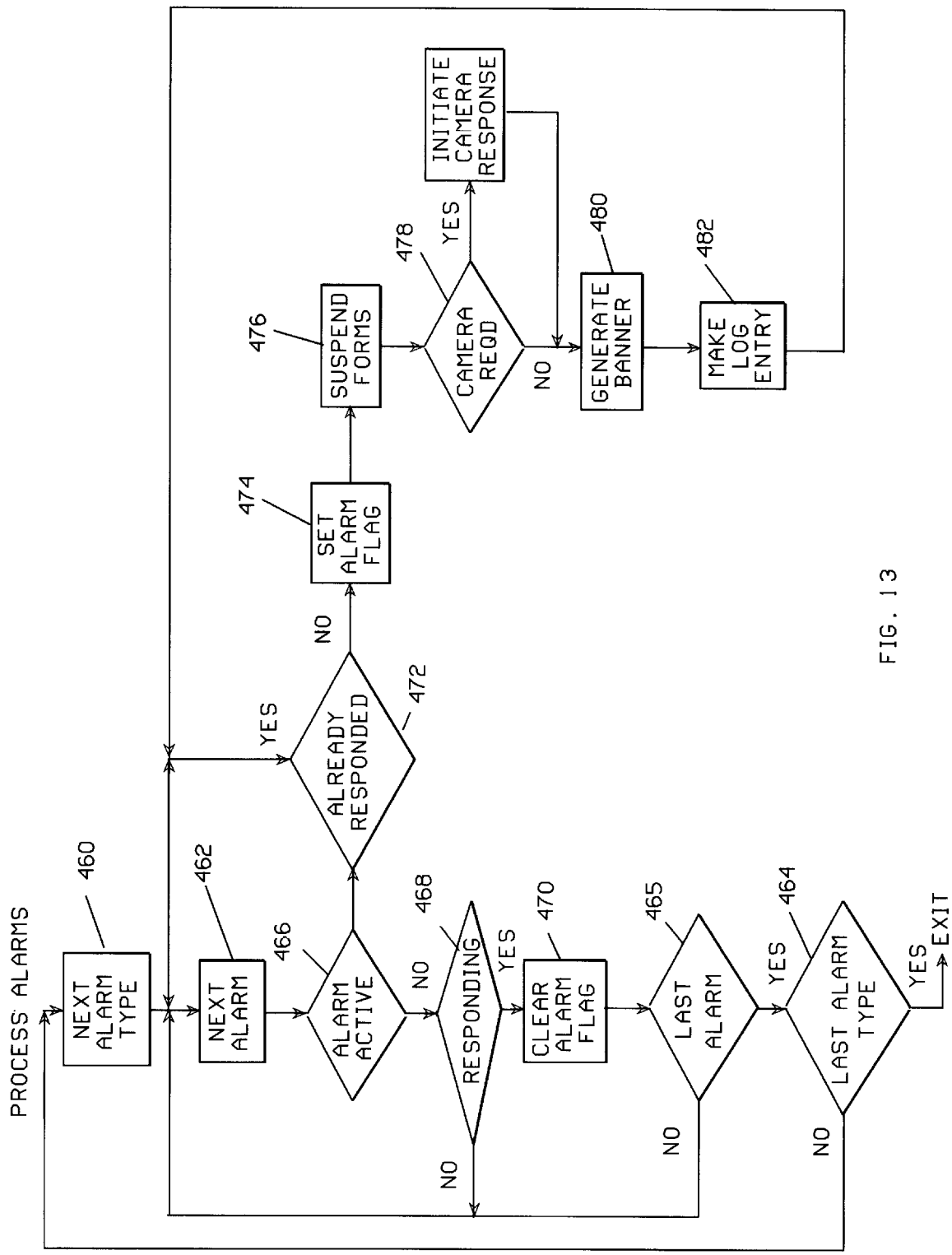
FIG. 13 is a flowchart showing a method of processing discrete alarms.

The processing of alarms is detailed in FIG. 13, where at boxes 460 and 462 polling of the alarm switches is represented. At box 460, each discrete alarm of a plurality of a category of alarms, such as fire alarms, alarms indicating tampering, etc. is polled to determine if any member of the particular alarm category is active, as indicated at box 466. After the alarms of one category are polled, the test is made at box 464 to see if all the alarm catagories have been polled, and if not, alarms of the next category are polled as shown at box 460. The inquiry is made at box 466 if a particular alarm of a given category is active, and if not, it is determined at box 468 if the associated alarm response is in progress. If so, the alarm response is cancelled at box 470. If the alarm is active, as in a switch being closed, a test is made at box 472 as to whether the alarm response has already been initiated. If so, the program loops back to box 462 where the next alarm is tested. If the alarm is not active, an alarm response will be initiated, with a flag indicating the alarm response set at box 474. After the alarm flag is set, the forms feature initiated by PROCESS CHARACTER is suspended at box 476, as an alarm is a high priority event. At box 478, the inquiry is made as to whether camera responses are required. If a camera response is required the necessary cameras are commanded to their preset alarm views and the resulting video displayed on a set of predefined monitors. Next an alarm or event banner is generated and presented to the operator as shown in box 480, and at box 482 a log entry is created, typically in nonvolatile memory, for printing or examination at a later time. After the log entry is created the program resumes polling at box 462.

With respect to PROCESS MESSAGES box 178 (FIG. 4), the following table lists some of the messages transmitted by the network, and the processing action initiated by the respective message.

| MESSAGE | RESPONSE |
| --- | --- |
| SYSTEM INITIALIZE | SEND CAMERA STATUS TO REQUESTOR |
| OPERATOR LOG ON | RETURN CURRENT STATION OPERATOR ALERT MESSAGE TO CURRENT OPERATOR |
| STATION LOG OUT | MESSAGE TO OPERATOR |
| OPERATOR LOG IN ERROR | ENTER ENTRY INTO LOG FILE START UNAUTHORIZED OPERATION ALARM |
| MAIL MESSAGE | DISPLAY TO OPERATOR |
| CAMERA PRESET | UPDATE CAMERA DATA BASE FOR HARDWARE PRESET |
| PARK REQUEST | PARK CAMERA FOR STATION HAVING ONLY SINGLE CAMERA COMMAND CAPABILITY |
| CAMERA UPDATE | UPDATE CAMERA STATE |

In this table, the SYSTEM INITIALIZE message alerts other stations that a station that was off-line is now coming back on-line, and is requesting that the other stations send camera status data thereto. The response of the other stations is to provide the states of their active cameras and the name of the operator at that station. The OPERATOR LOGON message indicates to other stations that a different operator has come on duty, and is now the current station operator. The next message, STATION LOGOUT, indicates that the station from which the message is sent is going off line. The OPERATOR LOGIN ERROR message indicates that an invalid password or other security check has been entered into the computer, possibly an indication that an unauthorized person is attempting to access the computer system. The response is to optionally initiate a camera movement to view the station where the alarm is initiated, alert the other operators with a banner and create a log file entry. The MAIL MESSAGE is a message system wherein the operators may send one line notes to each other.

The CAMERA PRESET message indicates that a hardware preset is being set for a particular camera, which presets being set in the hardware portion of the camera system so that each station must use, and thus be aware of, the preset view. In contrast, use of Applicant's software presets allows each station to have its own, independent presets for each camera. This feature is derived from Applicants open loop camera control wherein the preset information is stored at the station level, which are independent from each other, as opposed to being stored in the camera system, which is shared between the camera stations.

With respect to the PARK REQUEST message, this is a particular feature of Applicants system that accomodates camera systems that poll each station for inputs. Here, these polling type camera systems can move only one camera at a time, and cannot park the previous camera after switching to a new camera. As such, the message PARK REQUEST instructs a master station equipped with Applicants system to park cameras of the other stations.

The CAMERA UPDATE message is required each time a camera stops a motion under the control of a particular station and is sent to all the other stations. The message contains the camera state and allows each station to become current with the activities of the other stations, particulary with regard to the views being observed by the various cameras. Thus if one station leaves a camera at a view other than it's parking view, a different station attempting to use that camera will not be required to locate the current view.

Having thus described my invention and the manner of its use, it is apparent that minor incidental changes may be made thereto without departing from the scope of the following appended claims, wherein I claim:

1. A method implemented by a data processor for controlling at least one movable camera without closed loop feedback information, said camera positioned to surveil an area and provide a view of a portion of said area as an output, and at least one monitor, and comprising the steps of:
   1) overlaying said area with a coordinate system so that every point in said area is located by a unique set of coordinates,
   2) developing a motion model for said camera wherein rates of each motion parameter of the camera are found and stored in memory,
   3) referencing an orientation of said camera to at least one set of coordinates in said coordinate system,
   4) selecting a point in said area to be viewed by said camera,
   5) calculating camera movement using said rates developed by said motion model and a referenced said orientation of said camera to direct said camera to said point,
   6) moving said camera according to a calculated said camera movement,
   7) coupling said output from said camera to said monitor to display said point on said monitor.

2. A method as set forth in claim 1 wherein said motion model of said camera is developed by steps comprising:
   1) recording a panoramic view of said area,
   2) driving said camera between a plurality of randomly selected views within said panoramic view,
   3) comparing each of said randomly selected views with portions of said panoramic view to determine location of each of said randomly selected views in said panoramic view,
   4) recording time intervals needed to drive said camera between said randomly selected views.

3. A method as set forth in claim 1 further comprising the step of utilizing a CADD drawing as said coordinate system.

4. A method as set forth in claim 3 further comprising the steps of identifying entities of interest in said CADD drawing, and extracting coordinates of each of said entities of interest from said CADD drawing for driving a camera to view a selected one of said entities of interest.

5. A method as set forth in claim 4 further comprising the step of developing an entity data file wherein extracted said coordinates of each of said entities of interest are associated with an identification attribute for identifying a particular entity of interest and an area reference attribute for identifying a particular area within which the entity of interest resides.

6. A method as set forth in claim 5 further comprising the step of associating with each said extracted set of coordinates of said entity of interest height information relating to a distance from a floor a view of the entity of interest is centered, and distance from said camera to said entity of interest for focusing a lens of said camera on said entity of interest.

7. A method as set forth in claim 1 further comprising the step of generating a representation of said view in said area as projected on a floor of said area, said representation synchronized with camera movement and adjustable in size to reflect an actual field of view of said camera.

8. A method as set forth in claim 1 wherein said step 5) thereof further comprises the step of touching a point in a graphical display of said area on a touch screen monitor to select said point to be viewed.

9. A process for open loop camera control implemented by a data processor wherein cameras are moved relative to at least one CADD drawing comprising the steps of:
   1) determining a motion model for each of said cameras,
   2) referencing each said camera to a respective said CADD drawing,
   3) referencing objects of interest to said CADD drawing,
   4) calculating camera movement using parameters of said motion model and coordinates of a selected one of said objects of interest.

10. A method as set forth in claim 7 wherein at least one said motion model is determined by steps comprising:
   1) recording a panoramic view from said camera,
   2) randomly selecting a plurality of views from said camera,
   3) comparing each said random view with said panoramic view and determining a location of said random view within said panoramic view,
   4) using motor ON time intervals between said random views together with motor motion to determine motor backlash, acceleration, deceleration, and maximum speed.

11. An open loop method implemented by a data processor for controlling a plurality of movable surveillance cameras comprising the steps of:
   1) determining rate of operation of each type camera movement for each camera of said cameras,
   2) referencing areas viewable by each said movable camera with at least a planar reference wherein coordinates of any point in said planar reference, and thus any point in said areas, may be precisely located,
   3) selecting a point of interest to be viewed in said areas,
   4) selecting at least one camera of said cameras to view said point of interest,
   5) using a determined said rate of operation for each said type camera movement, and coordinates of said point of interest as referenced by said planar reference, to calculate time intervals of movement for each said type camera movement necessary to move said one camera from its current viewing location to said coordinates of said point of interest so that said one camera views said point of interest.

12. A method as set forth in claim 11 wherein a plurality of predetermined points of interest are viewed in a predetermined sequence, and comprising the steps of:
   1) selecting a first predetermined point of interest in said sequence,
   2) moving a camera of said cameras to view said first point of interest,
   3) pausing at said first predetermined point of interest for a selected interval,
   4) selecting successive points of interest in said predetermined sequence, and moving at least one camera of said cameras to view each of said predetermined points of interest, and
   5) pausing at each of said predetermined points of interest for a predetermined interval.

13. A method as set forth in claim 12 wherein camera movement between each of said predetermined points of interest comprises the step of continuously adjusting a rate of chance of azimuth and elevation angles of said one camera so that a view from said one camera moves along a predetermined path between each of said predetermined points of interest at a constant speed so that said path is viewable.

14. A method as set forth in claim 12 further comprising the steps of:
 1) converting said coordinates of each of said predetermined points of interest to azimuth and elevation angles of said one camera,
 2) independently driving azimuth and elevation mechanisms of said one camera to said azimuth and elevation angles to view each of said points of interest in said predetermined sequence.

15. A method as set forth in claim 11 wherein said step 5) thereof further comprises the steps of:
 1) generating a moving destination that moves relative to said areas,
 2) continuously calculating and adjusting each said type camera movement to drive said one camera to track said moving destination.

16. A method as set forth in claim 11 wherein said step 5) thereof further comprises the steps of:
 1) converting said coordinates of said point of interest to azimuth and elevation angles,
 2) moving said one camera to said azimuth and elevation angles independently of one another to view said point of interest.

17. A method as set forth in claim 11 further comprising the steps of:
 1) coupling a plurality of alarm means to said data processor, each said alarm means adapted to provide an alarm signal to said data processor responsive to an alarm condition,
 2) interrupting operation of said data processor responsive to reception of a said alarm signal by said data processor,
 3) providing an indication of said alarm signal,
 4) entering alarm data related to said alarm signal into a log file,
 5) moving at least one said camera in accordance with said step 5) of claim 11 to view a said area from which said alarm signal originates.

18. A method as set forth in claim 11 further comprising the step of displaying a graphical view of a floor plan of an area viewable by at least one said camera on the same monitor with video from said camera.

19. A method as set forth in claim 11 further comprising the steps of:
 1) locating a nearest hardware preset view to said point of interest,
 2) moving said one camera to said hardware preset view,
 3) after said hardware preset view is acquired, moving said one camera in accordance with said step 5) of claim 11 to said point of interest.

20. A method as set forth in claim 19 further comprising the step of using azimuth and elevation angles of said hardware preset view to calibrate position of said one camera when said hardware preset view is acquired.

21. A method as set forth in claim 11 further comprising the steps of:
 1) after initialization, and during operation of a camera, acquiring a reference view having known azimuth and elevation angles with respect to a said camera observing said reference view,
 2) removing alignment errors of said camera after said reference view is acquired.

22. A method as set forth in claim 21 further comprising the step of moving said camera to a parking view after said alignment errors of said camera are removed.

23. A method as set forth in claim 21 wherein said step 1) thereof further comprises the step of including an identifiable point source of light at known azimuth and elevation angles in said reference view for locating said reference view.

24. A method as set forth in claim 11 wherein each said rate of operation includes the step of calculating each said type camera movement in sets of small, discrete increments of time, each of said sets representative of a total length of time calculated for a discrete said type camera movement.

25. A method as set forth in claim 24 wherein during each of said small increments of time,
 1) checking, for each of said cameras, a plurality of status flags each indicating a said type camera movement, and where a status flag of said status flags for a said type camera movement is set,
 2) decrementing a total number of said increments of time by one,
 3) terminating said type camera movement and resetting said status flag after said total number of said increments of time expire.

26. A method as set forth in claim 11 further comprising the step of appending a height coordinate to coordinates of selected points of interest, so that when a selected point of interest is selected for viewing, a respective said camera is moved to image a selected height over said selected point of interest.

27. A method as set forth in claim 26 further comprising the step of utilizing coordinates from a CADD drawing as said planar reference.

* * * * *